United States Patent
Iizuka et al.

(10) Patent No.: US 9,580,077 B2
(45) Date of Patent: Feb. 28, 2017

(54) CONTROL DEVICE, VEHICLE INCLUDING CONTROL DEVICE, AND CONTROL PROGRAM

(71) Applicant: YAMAHA HATSUDOKI KABUSHIKI KAISHA, Iwata-shi, Shizuoka (JP)

(72) Inventors: Shinya Iizuka, Shizuoka (JP); Yasunori Murayama, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 238 days.

(21) Appl. No.: 14/397,493

(22) PCT Filed: Jan. 22, 2013

(86) PCT No.: PCT/JP2013/051136
§ 371 (c)(1),
(2) Date: Oct. 28, 2014

(87) PCT Pub. No.: WO2014/115238
PCT Pub. Date: Jul. 31, 2014

(65) Prior Publication Data
US 2015/0134212 A1 May 14, 2015

(51) Int. Cl.
*B60W 30/19* (2012.01)
*B60W 10/113* (2012.01)
(Continued)

(52) U.S. Cl.
CPC ........... *B60W 30/19* (2013.01); *B60W 10/113* (2013.01); *F16H 61/0213* (2013.01);
(Continued)

(58) Field of Classification Search
CPC .. B60W 30/19; B60W 10/113; F16H 61/0213; F16H 61/688; F16H 61/32; F16H 63/18
See application file for complete search history.

(56) References Cited

U.S. PATENT DOCUMENTS 7,673,727 B2 * 3/2010 Zenno .................. B60W 10/02
192/3.56
2005/0211007 A1 9/2005 Suzuki et al.
(Continued)

FOREIGN PATENT DOCUMENTS

| JP | 2005-273829 A | 10/2005 |
| JP | 2007-078087 A | 3/2007 |
| JP | 2009-156375 A | 7/2009 |

OTHER PUBLICATIONS

Official Communication issued in International Patent Application No. PCT/JP2013/051136, mailed on Feb. 26, 2013.

*Primary Examiner* — Jacob S Scott
(74) *Attorney, Agent, or Firm* — Keating and Bennett, LLP

(57) ABSTRACT

A gearbox of a twin clutch includes dog portions of a movable gear and a fixed gear which may be disengaged and re-engaged with each other. A control device for a vehicle including the twin clutch includes a shift actuator control unit that, when shifting a gear to another speed, outputs a target position signal so as to shift a rotation position of a shift actuator to a gear shift position at which a gear shift operation is performed by a transmission, and a clutch control unit that outputs torque signals so as to connect a clutch that transmits power to, among movable gears and fixed gears, a movable gear or a fixed gear including a dog portion to be disengaged. The shift actuator control unit outputs the target position signal so as to return the rotation position of the shift actuator to a neutral position.

12 Claims, 16 Drawing Sheets

(51) Int. Cl.
  *F16H 61/688*  (2006.01)
  *F16H 61/02*   (2006.01)
  *F16H 63/18*   (2006.01)
  F16H 61/32     (2006.01)
  F16H 63/30     (2006.01)

(52) U.S. Cl.
  CPC .......... *F16H 61/688* (2013.01); *F16H 63/18* (2013.01); *F16H 61/32* (2013.01); *F16H 2063/3089* (2013.01); *F16H 2306/18* (2013.01)

(56) References Cited

U.S. PATENT DOCUMENTS

| | | | |
|---|---|---|---|
| 2009/0165582 A1 | 7/2009 | Tsunashima et al. | |
| 2009/0292429 A1* | 11/2009 | Zenno | B60W 10/02 |
| | | | 701/56 |
| 2011/0054752 A1* | 3/2011 | Arai | F16D 48/062 |
| | | | 701/67 |
| 2011/0100144 A1* | 5/2011 | Neelakantan | F16H 63/18 |
| | | | 74/473.36 |

* cited by examiner

CONTROL DEVICE, VEHICLE INCLUDING CONTROL DEVICE, AND CONTROL PROGRAM

BACKGROUND OF THE INVENTION

1. Field of the Invention

The present invention relates to a control device, a vehicle including the control device, and a control program. More specifically, preferred embodiments of the present invention relate to a control device that causes an actuator to operate clutches and transmission mechanisms provided respectively on two paths to transmit torque from an engine, and also to a vehicle including the control device and a control program.

2. Description of the Related Art

There has been known a technology for a twin clutch type transmission device, in which, in a case of releasing meshing of a dog clutch at the time of a gear shift, a failure that a dog tooth is not drawn out from a dog hole (dog tip caught state) is detected by a sensor, and, in response to detection of this failure, a shift control motor or the like is driven to cancel the meshing state (refer to JP 2009-156375 A).

In a gearbox of the twin clutch type as described above, dog portions of a movable gear and a fixed gear, which are disengaged once from each other in a transmission mechanism on a side that is disengaged at the time of a gear shift, may be re-engaged with each other. In particular, the dog portions are shaped to be easily engaged with each other, and hence a risk of occurrence of this re-engagement cannot be ignored. In this case, as in the related art described above, it may be appropriate to re-drive the shift control motor or the like so as to cancel the engagement state. However, in this case, there arises a problem of a delay in the gear shift operation.

SUMMARY OF THE INVENTION

In view of the problems described above, preferred embodiments of the present invention provide a control device configured to effectively prevent dog portions of a movable gear and a fixed gear, which are re-disengaged from each other, from being re-engaged with each other, and provide a vehicle including the control device.

According to a preferred embodiment of the present invention, a control device includes a clutch control unit configured and programmed to output torque signals to control torques to be applied to clutches provided respectively on two paths that transmit torque from an engine; and a shift actuator control unit configured and programmed to control a rotation position of a shift actuator so as to move movable gears in a transmission mechanism which includes odd-speed movable gears, odd-speed fixed gears, even-speed movable gears, and even-speed fixed gears and which is configured to connect to each of the clutches. The shift actuator control unit outputs a target position signal that corresponds to a target rotation position of the shift actuator so as to control engagement or disengagement of a dog portion of each of the movable gears and a dog portion of each of the fixed gears in the transmission mechanism. When shifting a gear to another speed, the shift actuator control unit outputs the target position signal so as to shift the rotation position of the shift actuator to a gear shift position at which a gear shift operation is performed by the transmission mechanism, the clutch control unit outputs the torque signals so as to connect one of the clutches that transmits power to, among the movable gears and the fixed gears, a movable gear or a fixed gear including the dog portion to be disengaged, and then the shift actuator control unit outputs the target position signal so as to return the rotation position of the shift actuator to a neutral position.

Further, according to a preferred embodiment of the present invention, there is provided a vehicle including the above-mentioned control device.

Further, according to a preferred embodiment of the present invention, there is provided a control program to control a computer to function as a clutch control unit configured and programmed to output torque signals to control torques to be applied to clutches provided respectively on two paths that transmit torque from an engine; and a shift actuator control unit configured and programmed to control a rotation position of a shift actuator so as to move movable gears in a transmission mechanism which includes odd-speed movable gears, odd-speed fixed gears, even-speed movable gears, and even-speed fixed gears and which is configured to connect to each of the clutches. The shift actuator control unit outputs a target position signal that corresponds to a target rotation position of the shift actuator so as to control engagement or disengagement of a dog portion of each of the movable gears and a dog portion of each of the fixed gears in the transmission mechanism. When shifting a gear to another speed, the shift actuator control unit outputs the target position signal so as to shift the rotation position of the shift actuator to a gear shift position at which a gear shift operation is performed by the transmission mechanism, the clutch control unit outputs the torque signals so as to connect one of the clutches that transmits power to, among the movable gears and the fixed gears, a movable gear or a fixed gear including the dog portion to be disengaged, and then the shift actuator control unit outputs the target position signal so as to return the rotation position of the shift actuator to a neutral position.

Thus, with various preferred embodiments of the present invention, it is possible to effectively prevent the dog portions of the moving gear and the fixed gear, which are disengaged from each other, from being re-engaged with each other.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
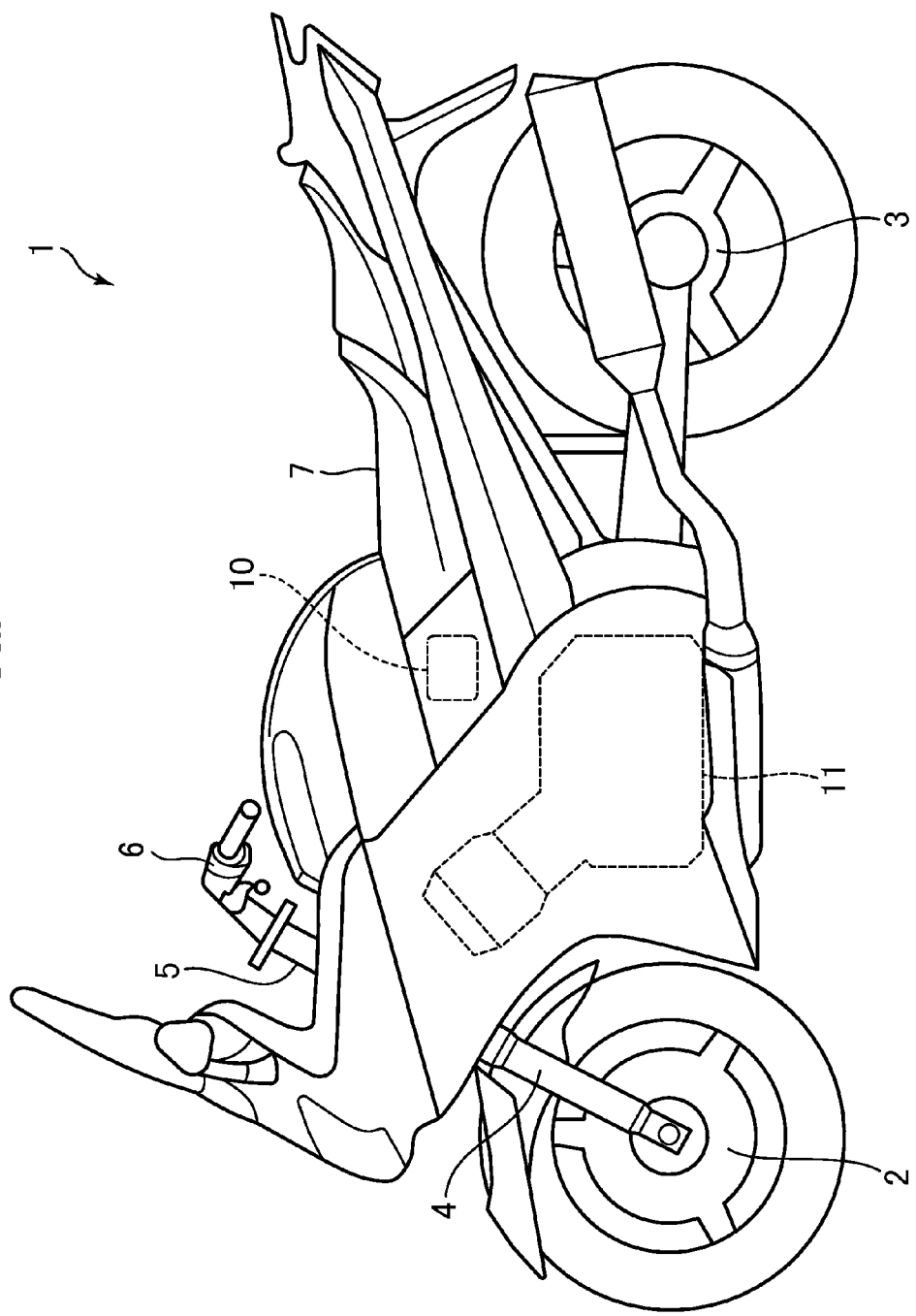
FIG. 1 is a side view of a motorcycle including a control device.
Figure 2:
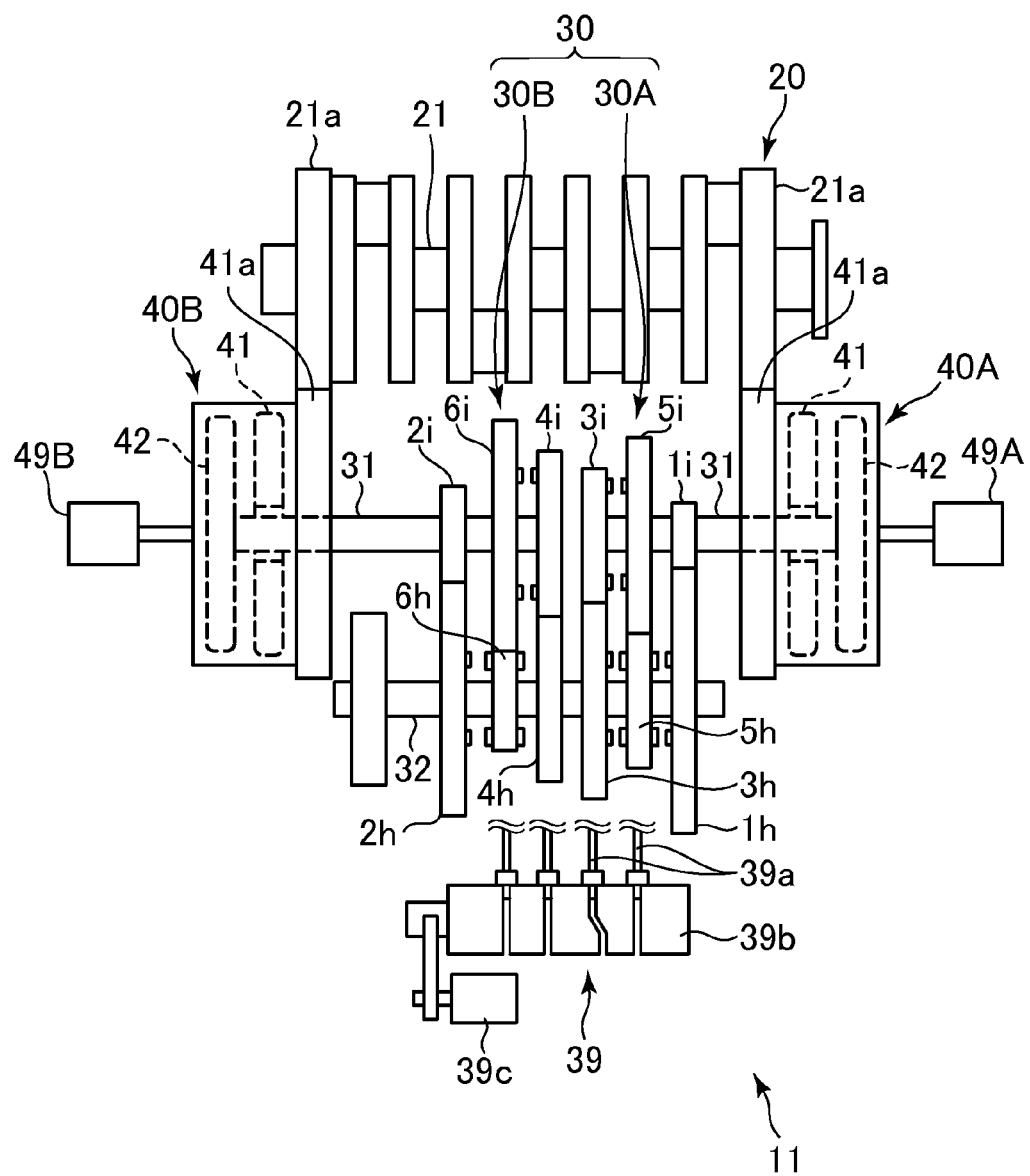
FIG. 2 is a schematic explanatory view of an engine unit.
Figure 3:
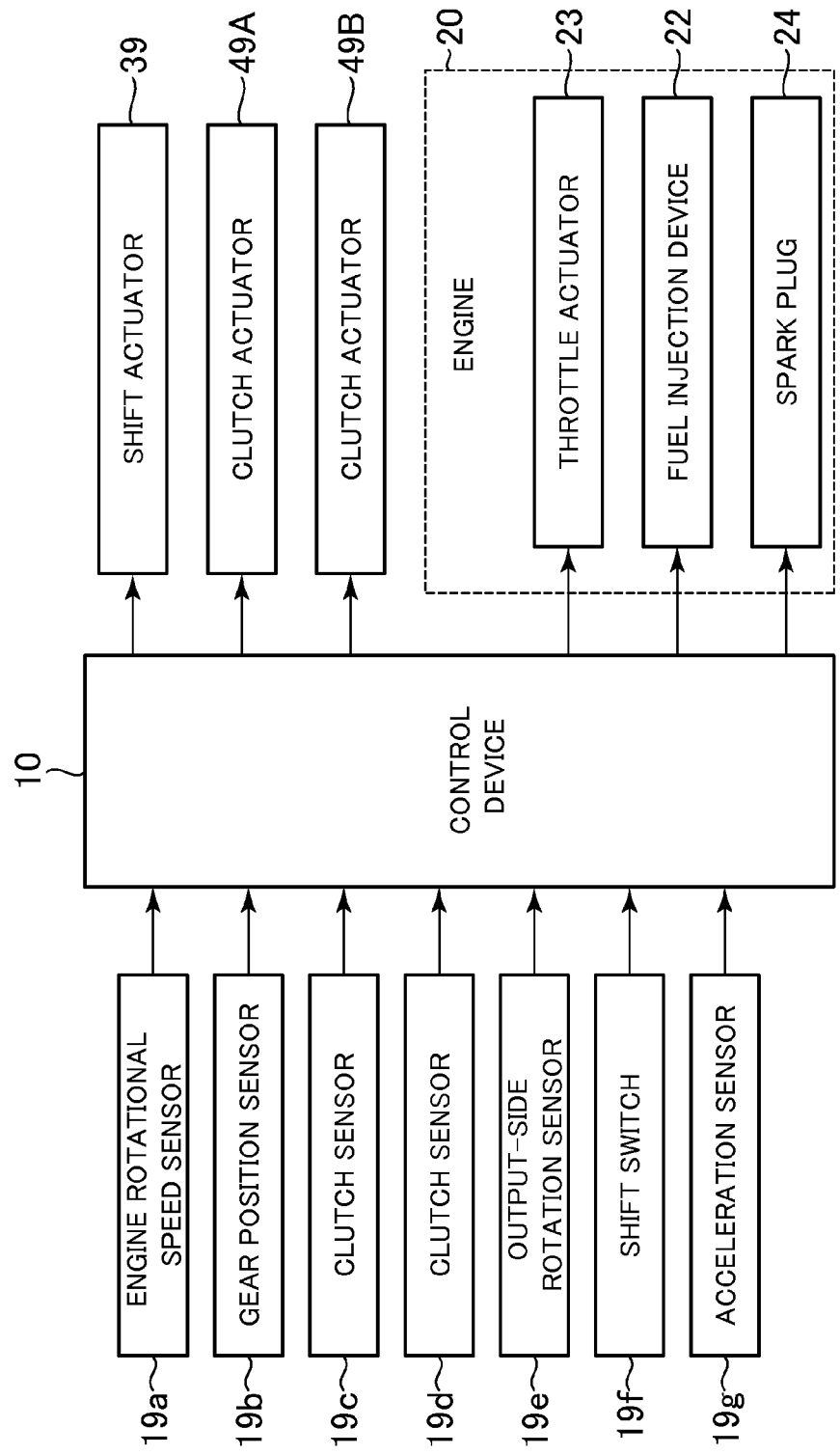
FIG. 3 is an explanatory diagram of a functional configuration of the motorcycle.

In the following, description is made of preferred embodiments of the present invention with reference to the drawings. FIG. 1 is a side view of a motorcycle including a control device according to a preferred embodiment. FIG. 2 is a schematic view of a mechanism provided on a torque transmission path from an engine to an output shaft of the engine. FIG. 3 is an explanatory block diagram of a functional configuration of the motorcycle.

As illustrated in FIG. 1, a motorcycle 1 mainly includes a front wheel 2, a rear wheel 3, and an engine unit 11. The front wheel 2 is supported at a lower end of a front fork 4. The front fork 4 includes an upper portion coupled to a steering shaft 5 supported to be turnable at a foremost portion of a vehicle body frame (not shown). A steering handle 6 is provided on the upper side of the steering shaft 5. The steering handle 6, the front fork 4, and the front wheel 2 are turnable to the left and right integrally about the steering shaft 5.

Further, a seat 7 that a rider can sit astride is arranged behind the steering handle 6. The rear wheel 3 is arranged behind the engine unit 11. A gearbox 30 (refer to FIG. 2) outputs torque to the rear wheel 3 through intermediation of torque transmitting members (not shown) such as a chain, a belt, and a drive shaft.

As illustrated in FIG. 2, the motorcycle 1 preferably is a vehicle of what is called a twin clutch type, for example. Specifically, the engine unit 11 includes an engine 20, the gearbox 30, a first clutch 40A, and a second clutch 40B.

The engine 20 includes a crankshaft 21, and the crankshaft 21 includes two primary gears 21a. Torque of the engine 20 (which corresponds to rotation of the crankshaft 21) is input to each of the first clutch 40A and the second clutch 40B.

Examples of the first clutch 40A and the second clutch 40B include a single-plate or multi-plate friction clutch, and the first clutch 40A and the second clutch 40B each include a driving member 41, a driven member 42, and a primary gear 41a. Further, the primary gear 41a meshes with the primary gear 21a so that the driving member 41 interlocks with the rotation of the crankshaft 21. The driving member 41 and the driven member 42 are pressed against each other in an axial direction so as to transmit torque therebetween. Note that, examples of the driving member 41 include a friction disc, and examples of the driven member 42 include a clutch disc.

Examples of clutch actuators 49A and 49B include an electric motor, and the electric motor transmits power to any one of the driving member 41 and the driven member 42 of a corresponding one of the clutches 40A and 40B. With this configuration, the driving member 41 and the driven member 42 are pressed against or separated from each other by the clutch actuators 49A and 49B.

The gearbox or transmission 30 includes a first transmission mechanism 30A and a second transmission mechanism 30B. The first transmission mechanism 30A and the second transmission mechanism 30B are arranged on a downstream side with respect to the first clutch 40A and the second clutch 40B, respectively. Specifically, an input shaft 31 is provided for each of the first transmission mechanism 30A and the second transmission mechanism 30B. The input shaft 31 of the first transmission mechanism 30A is coupled to the driven member 42 of the first clutch 40A, and torque is input to the first transmission mechanism 30A through intermediation of the first clutch 40A. The input shaft 31 of the second transmission mechanism 30B is coupled to the driven member 42 of the second clutch 40B, and torque is input to the second transmission mechanism 30B through intermediation of the second clutch 40B. Further, the two transmission mechanisms 30A and 30B share an output shaft 32.

As described above, the motorcycle 1 includes two torque transmission paths from the crankshaft 21 of the engine 20 to the output shaft 32 of the gearbox 30. Specifically, the first path includes the first transmission mechanism 30A and the first clutch 40A, and the second path includes the second transmission mechanism 30B and the second clutch 40B. The output shaft 32 of the gearbox 30 is coupled to an axle of the rear wheel 3 through intermediation of the torque transmitting members such as the chain, the belt, and the shaft.

The first transmission mechanism 30A and the second transmission mechanism 30B include a plurality of gears $1i$ to $6i$ and $1h$ to $6h$. The gears $1i$ to $6i$ are provided on the input shaft 31, and the gears $1h$ to $6h$ are provided on the output shaft 32. The gears $1i$ and $1h$ mesh with each other, and a reduction gear ratio thereof corresponds to a first speed. Similarly, the gears $2i$ to $6i$ mesh respectively with the gears $2h$ to $6h$, and reduction gear ratios thereof correspond respectively to a second speed to a sixth speed. Specifically, the first transmission mechanism 30A includes the gears $1i$, $3i$, $5i$, $1h$, $3h$, and $5h$ corresponding to odd speeds, and the second transmission mechanism 30B includes the gears $2i$, $4i$, $6i$, $2h$, $4h$, and $6h$ corresponding to even speeds.

The transmission mechanisms 30A and 30B are each a transmission mechanism of what is called a selective sliding type. Specifically, in each of the gear pairs (for example, gears $1i$ and $1h$) corresponding to the respective speeds, one gear is freely rotated relative to the shaft provided with the one gear. Another gear meshes in spline engagement with the shaft provided with the another gear so as to be rotated integrally with the shaft.

Specifically, the gears $1h$, $5i$, $3h$, $4h$, $6i$, and $2h$ are freely rotated relative to the shafts provided with those gears. The gears $1i$, $5h$, $3i$, $4i$, $6h$, and $2i$ mesh with the shafts provided with those gears, and are always rotated integrally with the shafts. Thus, in a neutral mode (mode in which none of the speeds is set), gear pairs (5*i* and 5*h*) and (6*i* and 6*h*) interlock with the output shaft 32, and gear pairs (1*i* and 1*h*), (3*i* and 3*h*), (4*i* and 4*h*), and (2*i* and 2*h*) interlock with the input shaft 31.

Further, the gears that interlock with the input shaft 31 and the gears that interlock with the output shaft 32 are arranged adjacent to each other in the axial direction, and are movable relative to each other in the axial direction (in other words, can be brought close to and spaced apart from each other).

The plurality of gears 1*i* to 6*i* and 1*h* to 6*h* include gears provided with dog clutches. Engagement of dog portions (dogs) of the dog clutches enables the gears always interlocking with the input shaft 31 and the gears always interlocking with the output shaft 32 to be engaged with each other. With engagement of the gears on those two sides, rotation (torque) of the input shaft 31 of the first transmission mechanism 30A or the input shaft 31 of the second transmission mechanism 30B is transmitted to the output shaft 32. In FIG. 2, the gears 5*h*, 3*i*, 4*i*, and 6*h* are movable in the axial direction. Note that, in the following description, the gears that are movable in the axial direction are referred to as movable gears, and gears that do not move in the axial direction are referred to as fixed gears.

As illustrated in FIG. 2, the gearbox 30 is provided with a shift actuator 39 to move, in the axial direction, the gears 5*h*, 3*i*, 4*i*, and 6*h* (movable gears) that are movable in the axial direction. The shift actuator 39 includes shift forks 39*a*, a shift cam 39*b*, and an electric motor 39*c*. The electric motor 39*c* generates power to rotate the shift cam 39*b*. The shift cam 39*b* is provided with grooves (outer circumferential grooves) provided along an outer circumference thereof, and one end of each of the shift forks 39*a* is connected to one of the outer circumferential grooves. Then, the shift forks 39*a* selectively move in conjunction with rotation of the shift cam 39*b* so as to selectively move the movable gears. In this manner, the speeds are switched. Note that, description of structural and operational details of the shift actuator 39 is provided below.

Next, description is made of an example of a configuration of the motorcycle 1. As illustrated in FIG. 3, the motorcycle 1 includes the engine 20, an engine rotational speed sensor 19*a*, a gear position sensor 19*b*, clutch sensors 19*c* and 19*d*, an output-side rotation sensor 19*e*, a shift switch 19*f*, an acceleration sensor 19*g*, the shift actuator 39, the clutch actuators 49A and 49B, and a control device 10 connected to those components.

The engine 20 includes a fuel injection device 22, a throttle actuator 23, and a spark plug 24. The fuel injection device 22 supplies the engine 20 with fuel that is combusted in a combustion chamber of the engine 20. The throttle actuator 23 controls an opening degree of a throttle valve (not shown) to adjust an amount of air that flows through an air intake path of the engine 20. The spark plug 24 ignites a mixture of air that flows into the combustion chamber of the engine 20 and the fuel. The control device 10 is configured and programmed to control a fuel injection amount of the fuel injection device 22, an ignition timing of the spark plug 24, and the opening degree of the throttle valve (hereinafter, abbreviated as throttle opening degree).

Examples of the engine rotational speed sensor 19*a* include a rotation sensor that outputs a pulse signal having a frequency corresponding to an engine rotational speed. The control device 10 calculates the engine rotational speed (rotational speed of the crankshaft 21) based on the output signal from the engine rotational speed sensor 19*a*.

Examples of the gear position sensor 19*b* include a potentiometer that outputs a voltage signal corresponding to a rotation angle of the shift cam 39*b*. Based on the output signal from the gear position sensor 19*b*, the control device 10 detects positions of the movable gears 5*h*, 3*i*, 4*i*, and 6*h*, a current speed, and the like.

The output-side rotation sensor 19*e* is provided for the axle of the rear wheel 3 or the output shaft 32. Examples of the output-side rotation sensor 19*e* include a rotation sensor that outputs a pulse signal having a frequency corresponding to a rotational speed of the rear wheel 3 or a rotational speed of the output shaft 32. Based on the output signal from the output-side rotation sensor 19*e*, the control device 10 calculates a vehicle speed or the rotational speed of the output shaft 32.

The shift switch 19*f* is a switch that is operated by the rider, and outputs a gear shift command (a signal that corresponds to a shift-up command to increase a speed, and a signal that corresponds to a shift-down command to reduce a speed) from the rider to the control device 10. Note that, examples of the shift switch 19*f* include a shift-up switch and a shift-down switch.

The acceleration sensor 19*g* outputs a signal corresponding to an operation amount (turning angle) of an accelerator grip (not shown) provided on the steering handle 6. Examples of the acceleration sensor 19*g* include a potentiometer. Based on the output signal from the acceleration sensor 19*g*, the control device 10 detects the operation amount of the accelerator grip (accelerator operation amount).

The clutch sensor 19*c* is a sensor to detect a torque transmission capacity of the first clutch 40A (maximum torque that can be transmitted in a current mode (with a current engagement degree) of the first clutch 40A). Further, the clutch sensor 19*d* is a sensor to detect a torque transmission capacity of the second clutch 40B (value of maximum torque that can be transmitted in a current mode (with a current engagement degree) of the second clutch 40B). When the clutches 40A and 40B are in engaged modes, the torque transmission capacities become highest (hereinafter described as maximum torque capacity). When the clutches 40A and 40B are in disengaged modes, the torque transmission capacities become lowest (for example, reach about 0 Nm).

The torque transmission capacities correspond to positions of the clutches 40A and 40B (stroke amounts of the clutches). Examples of the clutch sensors 19*c* and 19*d* include potentiometers that output signals corresponding to the positions of the clutches 40A and 40B (signals corresponding to moving amounts of the clutch actuators 49A and 49B). From the clutch positions that are detected based on the output signals from the clutch sensors 19*c* and 19*d*, the control device 10 determines the torque transmission capacities. Specifically, the control device 10 calculates the torque transmission capacities from detected clutch positions by using a map or an operation expression that correlates the clutch positions and the torque transmission capacities with each other.

Specifically, for example, when the clutch actuators 49A and 49B hydraulically operate the clutches 40A and 40B, the torque transmission capacities correspond to oil pressures that are applied to the clutches 40A and 40B (hereafter abbreviated as clutch pressures). In this case, oil-pressure sensors that output signals corresponding to the clutch pressures are used as the clutch sensors 19*c* and 19*d*. Further, in this case, the control device 10 determines the torque transmission capacities based on the clutch pressures detected with the clutch sensors 19c and 19d. Specifically, the control device 10 calculates the torque transmission capacities from detected clutch pressures by using a map or an operation expression that correlates the clutch pressures and the torque transmission capacities with each other.

Further, the examples of the clutch sensors 19c and 19d may include strain sensors that output signals corresponding to degrees of strains of portions that receive forces from the clutches 40A and 40B. The torque transmission capacities correspond to forces that are applied from the clutch actuators 49A and 49B to the clutches 40A and 40B (pressing forces that are generated between the driving member 41 and the driven member 42). The forces that are applied from the clutch actuators 49A and 49B to the clutches 40A and 40B cause strains of the portions that receive the forces (such as cases of the clutches 40A and 40B). Thus, the control device 10 is preferably configured to determine the torque transmission capacities based on the strains detected by the clutch sensors 19c and 19d. In this case, specifically, the control device 10 calculates the torque transmission capacities from detected clutch strains by using a map or an operation expression that correlates the strains and the torque transmission capacities with each other.

The control device 10 includes a central processing unit (CPU), memories such as a read only memory (ROM) and a random access memory (RAM), and a drive circuit to drive the actuators 39, 49A, 49B, and 23, the fuel injection device 22, and the spark plug 24. The control device 10 causes programs that are stored in the memories to be executed by the CPU so as to control the engine 20, the gearbox 30, the clutches 40A and 40B, and the like. Note that, a clutch control unit and a shift actuator control unit are realized, for example, by the control device 10. Further, the programs in the memories may be provided, for example, from a non-transitory computer-readable storage medium.

Specifically, the control device 10 sets a target value of output torque from the engine 20 (target engine torque). Then, by using maps or operation expressions that are stored in advance in the memories, the control device 10 drives the throttle actuator 23, the fuel injection device 22, and the spark plug 24 so as to adjust actual output torque to the target engine torque. Further, the control device 10 sets target values (target torque capacities) of the torque transmission capacity of the first clutch 40A and the torque transmission capacity of the second clutch 40B. Further, the control device 10 operates the clutch actuators 49A and 49B so as to adjust actual torque transmission capacities to the target torque capacities (in other words, causes driving electric power to be supplied the clutch actuators 49A and 49B).

The control device 10 operates the shift actuator 39 so that the speeds set by the first transmission mechanism 30A and the second transmission mechanism 30B are shifted in response to the gear shift commands (in other words, the control device 10 causes the driving electric power to be supplied the shift actuator 39). Specifically, the control device 10 sets target values that correspond to positions of the shift actuator (target shift-actuator positions). Note that, the target shift-actuator positions correspond, for example, to rotation angles of a shift mechanism 500 described below, which is based on rotation angles of the motor 39c, more specifically, to rotation angles of a first transmission member 507. Then, the control device 10 operates the shift actuator 39 so as to shift an actual position of the shift actuator (rotation angle) to the target shift-actuator positions.

The control device 10 is configured and programmed to execute a plurality of control modes relating to gear shift control. The control device 10 performs power-on shift-up control in a case where the shift-up command is issued as the gear shift command and the accelerator operation amount is equal to or larger than a predetermined threshold (accelerator grip is opened). Further, the control device 10 performs power-off shift-up control in a case where the shift-up command is issued as the gear shift command and the accelerator operation amount is smaller than the predetermined threshold (accelerator grip is closed). In addition, the control device 10 performs power-on shift-down control in a case where the shift-down command is issued as the gear shift command and the accelerator operation amount is equal to or larger than the predetermined threshold. Further, the control device 10 performs power-off shift-down control in a case where the shift-down command is issued as the gear shift command and the accelerator operation amount is smaller than the predetermined threshold.

Next, description is made of an outline of the gear shift control. During normal driving (driving under a state in which the gear shift control is not performed), the torque of the engine 20 is transmitted to the output shaft 32 via only one path of the two paths from the crankshaft 21 to the output shaft 32. Specifically, during the normal driving, both the first clutch 40A and the second clutch 40B are set to the engaged modes. Further, any one transmission mechanism of the first transmission mechanism 30A and the second transmission mechanism 30B is set to a neutral mode, and a gear pair corresponding to a current speed is engaged through intermediation of the dog clutch in another transmission mechanism thereof. Thus, the torque of the engine 20 is transmitted only via the path including the another transmission mechanism.

Note that, in the following description, a clutch on a path that has transmitted torque before a gear shift (previous path) is referred to as a previous clutch. Further, a clutch on a path that has not transmitted torque before a gear shift (in other words, path that transmits torque after a gear shift, which is abbreviated hereinafter as a next path) is referred to as a next clutch. In addition, a transmission mechanism on the previous path is referred to as a previous transmission mechanism, and a transmission mechanism on the next path is referred to as a next transmission mechanism.

FIGS. 4A to 4D are schematic explanatory views of the gear shift control. Note that, in FIGS. 4A to 4D, for the sake of simplicity of description, the transmission mechanisms 30A and 30B and the clutches 40A and 40B illustrated in FIG. 2 are further simplified. In FIGS. 4A-4D, a clutch Cp corresponds to the previous clutch, and a clutch Cn corresponds to the next clutch. A transmission mechanism Tp corresponds to the previous transmission mechanism, and a transmission mechanism Tn corresponds to the next transmission mechanism. The previous transmission mechanism Tp includes a gear Gp1 corresponding to a movable gear that has transmitted torque at a previous speed (5h, 3i, 4i, or 6h), and a gear Gp2 corresponding to a fixed gear that has transmitted the torque at the previous speed (1h, 5i, 3h, 4h, 6i, or 2h). Further, the next transmission mechanism Tn includes a gear Gn1 corresponding to a movable gear that transmits torque at a next speed, and a gear Gn2 corresponding to a fixed gear that transmits the torque at the next speed. Further, for the sake of simplicity of description as described above, FIGS. 4A-4D illustrate a single movable gear Gp1, a single movable gear Gn1, a single fixed gear Gp2, and a single fixed gear Gn2. Further, the fixed gears Gp2 and Gn2 are fixed to the output shaft 32 (specifically, mesh in spline with the output shaft 32), and rotated integrally with the output shaft 32. The movable gears Gp1 and Gn1 are freely rotated relative to the output shaft 32. Still further, the movable gears Gp1 and Gn1 mesh respectively with gears Gp3 and Gn3 that are fixed to the input shaft 31, and rotated in conjunction with the gears Gp3 and Gn3 and the input shaft 31.

Figure 4A:
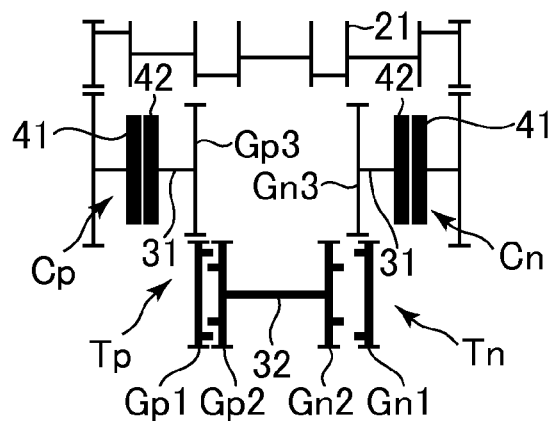
FIG. 4A is a schematic explanatory view of a gear shift control.
Figure 4B:
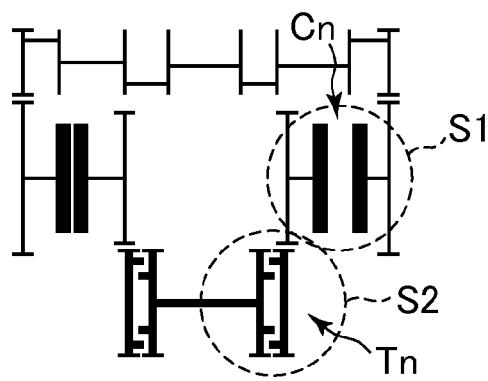
FIG. 4B is another schematic explanatory view of the gear shift control.

As illustrated in FIG. 4A, during normal driving, the two clutches Cp and Cn are set to the engaged modes (modes in which maximum torque transmission capacities are obtained). In the previous transmission mechanism Tp, the movable gear Gp1 and the fixed gear Gp2 that correspond to a previous speed are engaged with each other through intermediation of the dog clutch. Further, in the next transmission mechanism Tn, all the movable gears are arranged to neutral positions (position at which none of the movable gears is engaged with the fixed gear). Thus, the torque from the engine 20 toward the rear wheel 3 is transmitted via the one path (previous clutch Cp and previous transmission mechanism Tp) of the two torque transmission paths. On another path thereof, transmission of the torque is interrupted by the next transmission mechanism Tn.

In response to a gear shift command, the control device 10 switches the torque transmission path from the one to the another. Specifically, the control device 10 causes the movable gear Gn1 and the fixed gear Gn2 of the next transmission mechanism Tn to be engaged with each other, and the movable gear Gp1 of the previous transmission mechanism Tp to shift to the neutral position. More specifically, the transmission mechanisms Tp and Tn and the clutches Cp and Cn are operated as follows by the gear shift control. First, the control device 10 causes the next clutch Cn to be disengaged as indicated by S1 in FIG. 4B, and the movable gear Gn1 of the next transmission mechanism Tn to be moved and engaged with the fixed gear Gn2 adjacent thereto as indicated by S2 (what is called a dog engagement phase). After that, as indicated by S3 in FIG. 4C, the control device 10 causes the next clutch Cn to be returned from the disengaged mode to the engaged mode, and the previous clutch Cp to enter the disengaged mode (what is called a torque phase). Lastly, as indicated by S4 in FIG. 4D, the control device 10 causes the movable gear Gp1 of the previous transmission mechanism Tp to move to the neutral position, and then the previous clutch Cp to enter an engaged mode (what is called a dog disengagement phase).

Figure 4C:
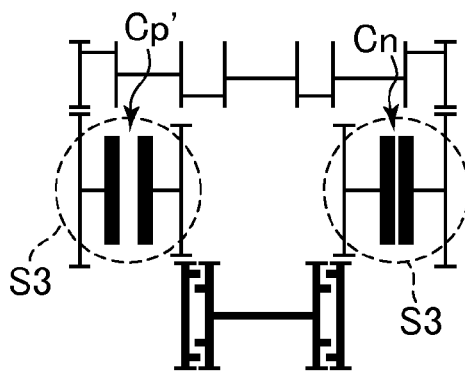
FIG. 4C is still another schematic explanatory view of the gear shift control.
Figure 4D:
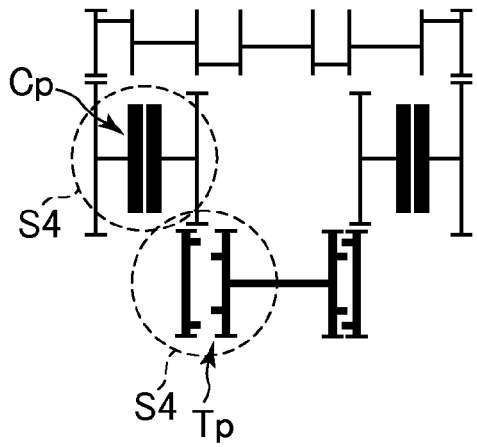
FIG. 4D is yet another schematic explanatory view of the gear shift control.

Note that, at the time of performing the gear shift control as described above, in order to significantly reduce or prevent fluctuation of a driving force of the rear wheel 3 during a gear shift (gear shift shock), rotational control to match a rotational speed of the driving member 41 and a rotational speed of the driven member 42 of the previous clutch Cp or the next clutch Cn with each other (what is called an inertia phase) is performed before or after a torque phase (refer to S3 in FIG. 4C). In other words, the plurality of control modes of the gear shift control of the control device 10 are executed by performing the torque phase before the inertia phase or by performing the inertia phase before the torque phase.

Figure 5:
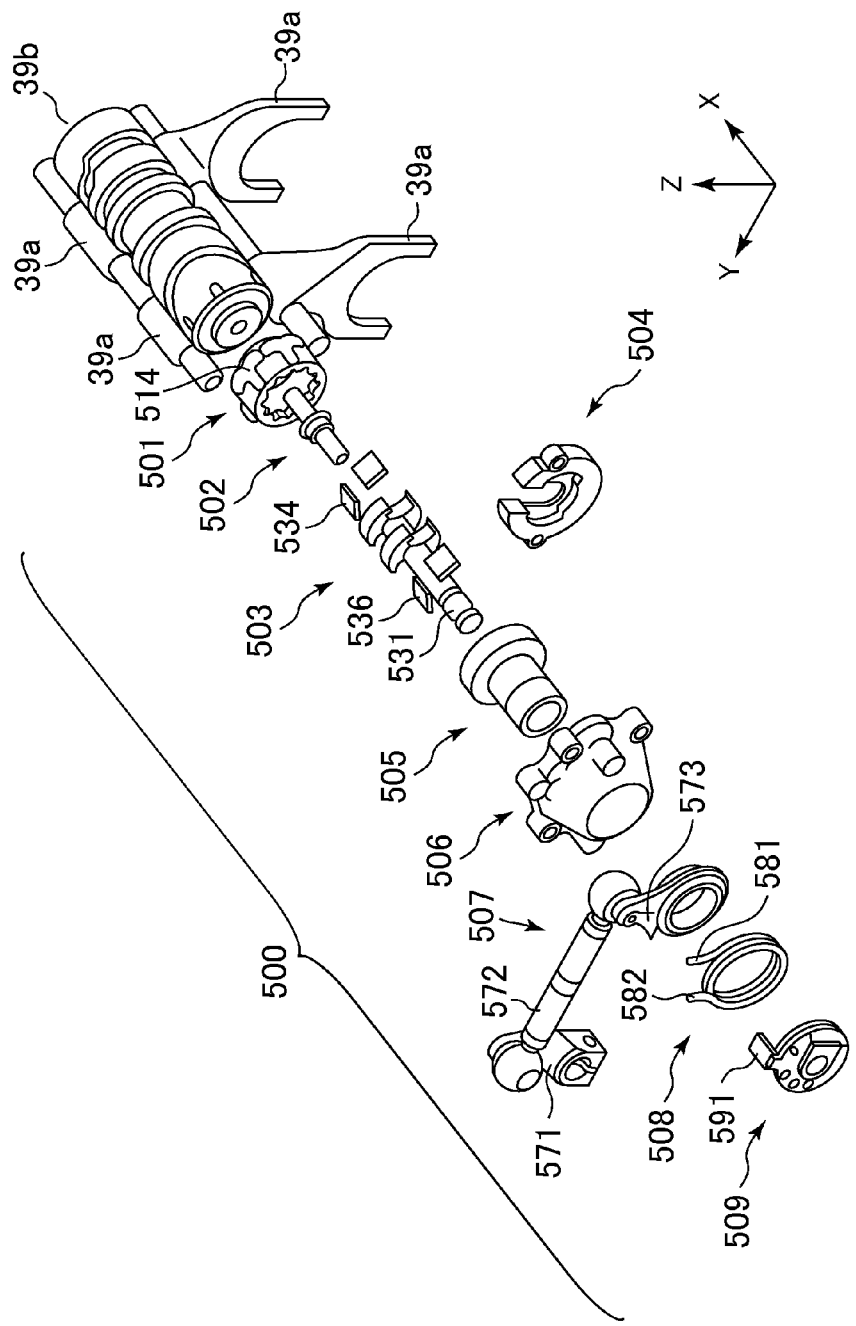
FIG. 5 is an explanatory structural view of a shift actuator.
Figure 6:
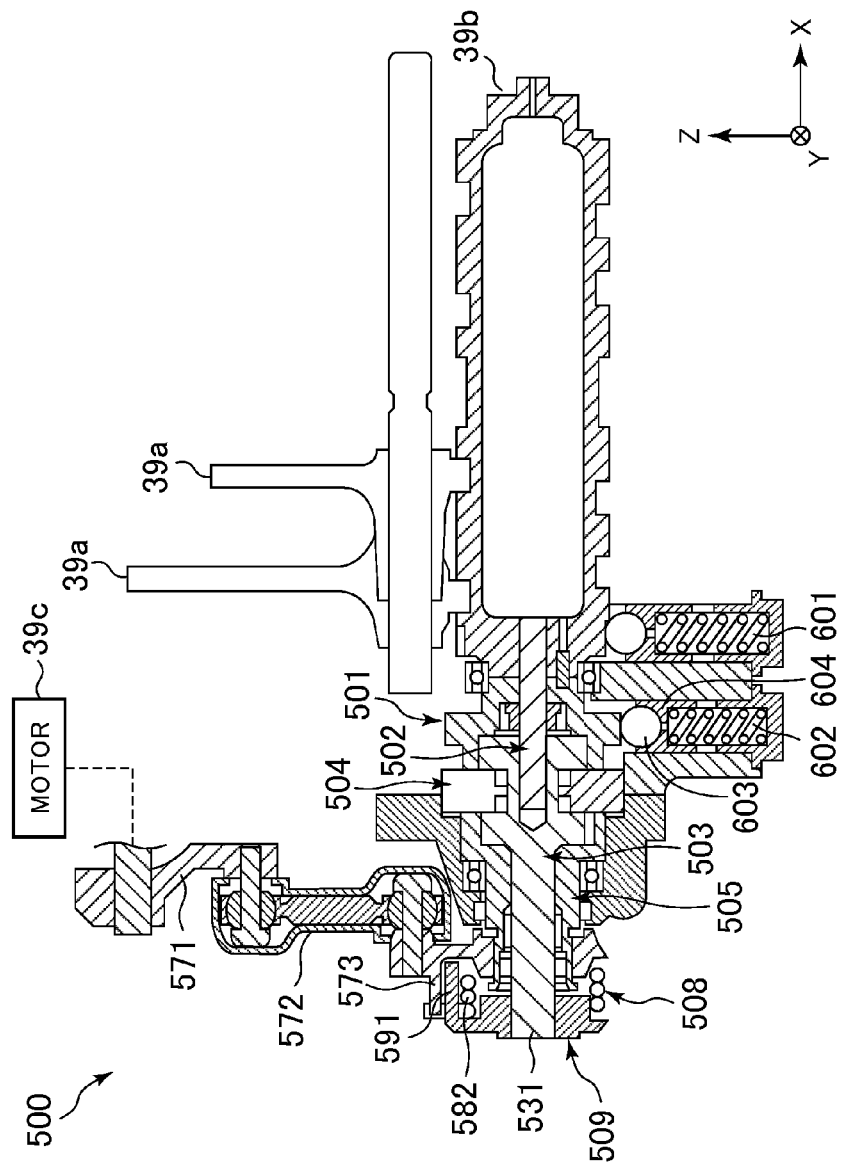
FIG. 6 is a sectional view of the shift actuator.

Next, with reference to FIGS. 5 to 11B, description is made of the main structure and the operation of the shift actuator 39 according to the present preferred embodiment. Note that, the structure of the shift actuator 39 is well known as described, for example, in Japanese Patent Application Laid-open No. 2010-156408, and hence detailed description thereof is omitted below. FIG. 5 is an explanatory view of an example of the structure of the shift actuator according to the present preferred embodiment. Specifically, FIG. 5 is an exploded perspective view of the shift actuator. FIG. 6 is a sectional view of the shift actuator. Specifically, FIG. 6 is a sectional view taken along an X direction of the shift actuator 39 illustrated in the exploded perspective view of FIG. 5.

As illustrated in FIGS. 5 and 6, the shift actuator 39 includes the shift mechanism 500, the shift cam 39b, and the shift forks 39a. Note that the shift mechanism 500 in the example described below includes a force storing mechanism that stores a rotational force generated by rotation of the motor 39c, but the preferred embodiments are not limited thereto. As a matter of course, the shift mechanism 500 does not need to include the force storing mechanism.

The shift mechanism 500 includes a first rotary member 501, a positioning shaft 502, a second rotary member 503, a regulating member 504, a third rotary member 505, a receiving member 506, the first transmission member 507, a torsion spring 508, and a second transmission member 509.

The shift cam 39b preferably has a circular columnar shape, and is connected to the shift mechanism 500. Further, the outer circumference grooves are provided along the outer circumference of the shift cam 39b. The one end of each of the shift forks 39a is connected into corresponding one of the outer circumferential grooves, and another end thereof is connected to corresponding one of the movable gears. Thus, when the shift cam 39b is rotated to move the shift forks 39a, the movable gears are moved in conjunction therewith. As a result, dog clutches of corresponding movable gears and fixed gears are engaged or disengaged.

Specifically, when the motor 39c is rotated at a predetermined rotation angle, in conjunction with this rotation, the third rotary member 505 is rotated through intermediation of the first transmission member 507, and torque generated by the rotation is stored in the torsion spring 508. The torque stored in the torsion spring 508 is transmitted to the second rotary member 503 through intermediation of the second transmission member 509. Then, when the torque increases to be equal to or higher than a predetermined torque, the second rotary member 503 is rotated. This rotation is transmitted to the first rotary member 501, and the shift cam 39b is rotated in conjunction therewith. As a result, the shift forks 39a connected to the shift cam 39b are moved. At this time, the first rotary member 501 is rotated and maintained at a predetermined rotation angle by an urging force applied from springs 601 and 602, and hence the shift cam 39b is intermittently rotated at each predetermined rotation angle. In the following, more specific description is made of the structure and the operation of the shift actuator 39.

As illustrated in FIG. 5, a rocker arm 571 is connected to a rotary shaft of the motor 39c. The rocker arm 571 pivots in conjunction with rotation of the rotary shaft of the motor 39c, and a transmission mechanism 572 is moved substantially in a Y-axis direction. With this configuration, the first transmission member 507 is rotated through intermediation of the transmission mechanism 572.

When the first transmission member 507 is rotated counterclockwise in FIG. 5, a locking portion 573 of the first transmission member 507 presses a second locking portion 582 of the torsion spring 508 in the counterclockwise direction. Thus, torque in the counterclockwise direction is generated in a first locking portion 581 of the torsion spring 508.

The torque generated in the torsion spring 508 is applied to a locking portion 591 of the second transmission member 509 through intermediation of the first locking portion 581. Thus, the torque in the counterclockwise direction is applied to the second transmission member 509. In this context, the second transmission member 509 is fixed to a shaft portion 531 of the second rotary member 503. Thus, the torque applied to the second transmission member 509 is applied to the second rotary member 503.

Figure 7A:
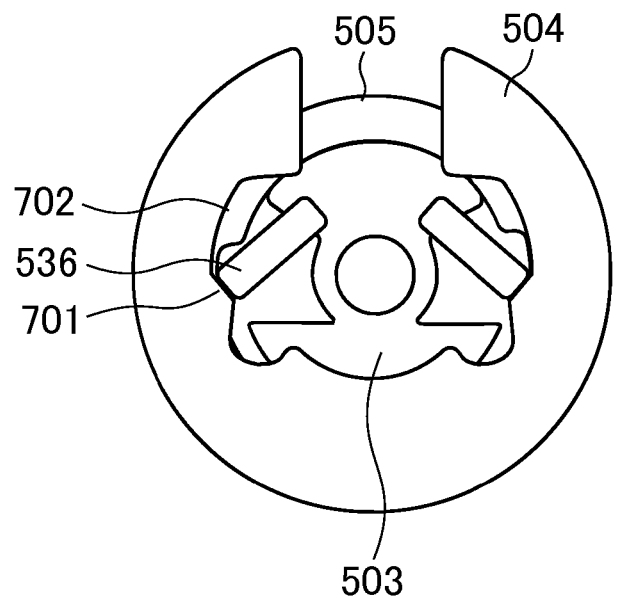
FIG. 7A is an explanatory view of an operation of the shift actuator.
Figure 7B:
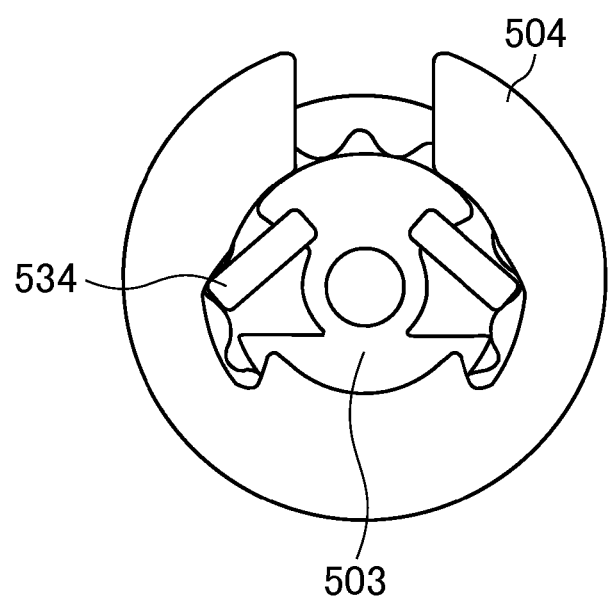
FIG. 7B is another explanatory view of the operation of the shift actuator.

As illustrated in FIG. 7A, in a normal mode in which the gear shift control has not been started, distal end surfaces of lug plates 536 face and are close to trigger surfaces 701 of the regulating member 504. In this case, even when the second rotary member 503 is rotated by the torque applied from the torsion spring 508, immediately after a start of this rotation operation, the distal end surfaces of the lug plates 536 abut against the trigger surfaces 701. Thus, movement of the lug plates 536 is hindered, and hence the rotation of the second rotary member 503 is also hindered.

Thus, immediately after the start of the rotation operation of the motor 39c, only the third rotary member 505 is rotated through intermediation of the first transmission member 507 under a state in which the second rotary member 503 is stopped. With this configuration, the counterclockwise torque is stored in the torsion spring 508. Note that, FIGS. 7A, 8A, 9A, 10A, and 11A each illustrate the second rotary member 503, the regulating member 504, the third rotary member 505, and other members as viewed in the X direction, and FIGS. 7B, 8B, 9B, 10B, and 11B each illustrate those components as viewed from the opposite side.

Figure 8A:
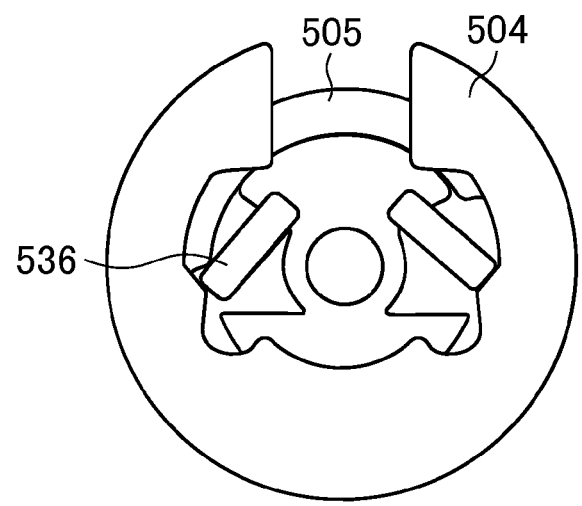
FIG. 8A is still another explanatory view of the operation of the shift actuator.
Figure 8B:
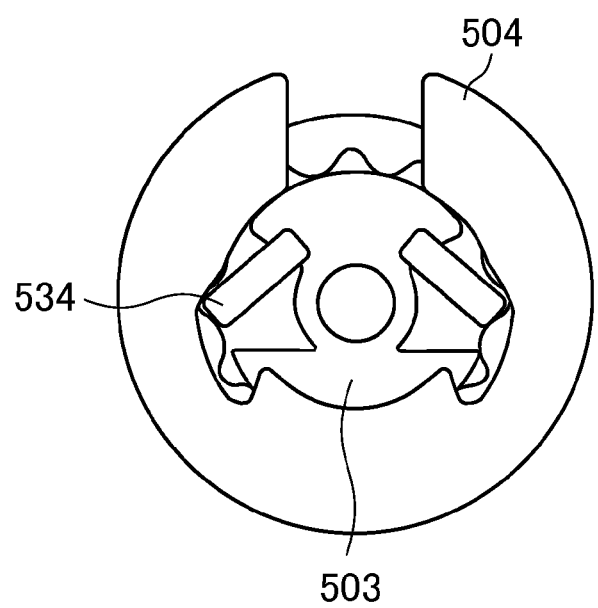
FIG. 8B is yet another explanatory view of the operation of the shift actuator.
Figure 10A:
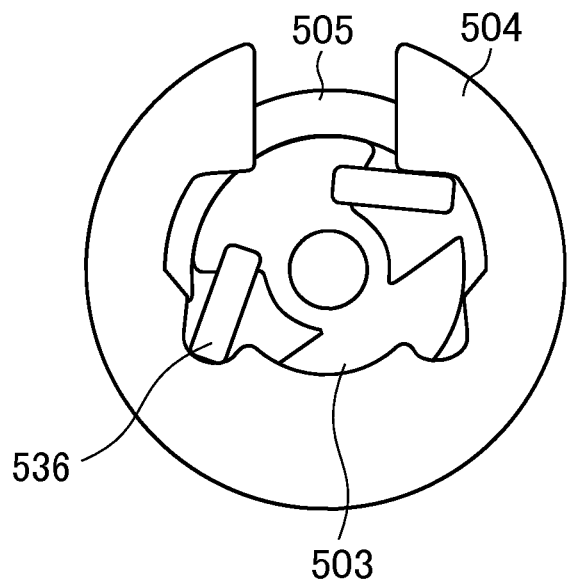
FIG. 10A is yet another explanatory view of the operation of the shift actuator.
Figure 10B:
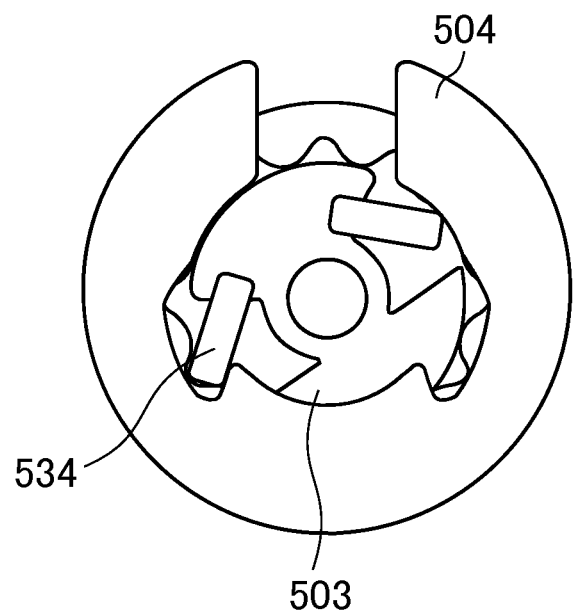
FIG. 10B is yet another explanatory view of the operation of the shift actuator.

When the third rotary member 505 is further rotated, as illustrated in FIG. 8A, the lug plates 536 are pushed about a rotation-axis direction by projecting portions of the trigger of the third rotary member 505. Note that, in this case, as illustrated in FIG. 8B, other parts are not changed, in other words, maintained in the same state as that illustrated in FIG. 7B. Then, as illustrated in 9A, when the third rotary member 505 in the normal mode is rotated at a predetermined angle (for example, approximately 32.5°), inclined surfaces 702 of the third rotary member cause the lug plates 536 to be pushed completely out of the trigger surfaces 701. With this configuration, the torque stored in the torsion spring 508 is released. As a result, as illustrated in FIGS. 10A and 10B, the second rotary member 503 is rotated counterclockwise.

Figure 9A:
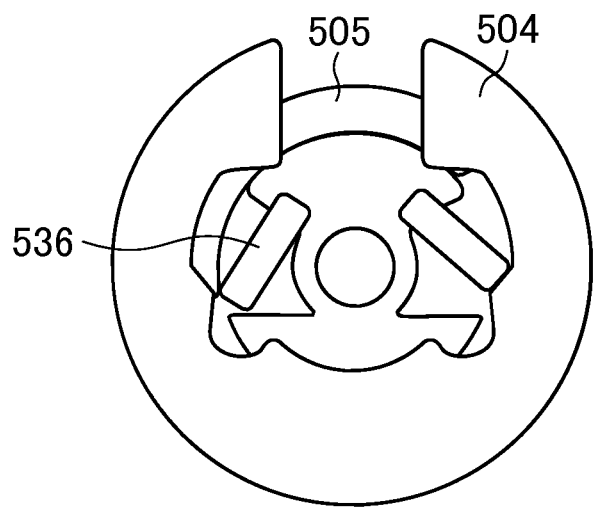
FIG. 9A is yet another explanatory view of the operation of the shift actuator.
Figure 9B:
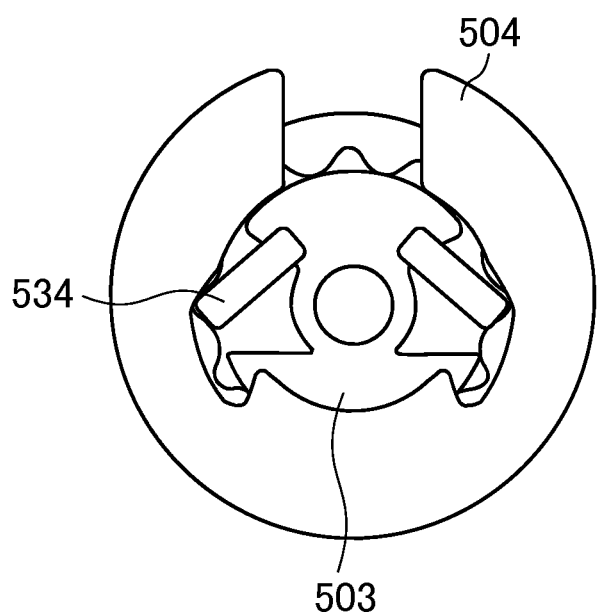
FIG. 9B is yet another explanatory view of the operation of the shift actuator.

Then, in conjunction with the counterclockwise rotation of the second rotary member 503, the first rotary member 501 is rotated counterclockwise. Further, in conjunction with this rotation of the first rotary member 501, the shift cam 39b is rotated. Therefore, the shift forks 39a are moved. Note that, also in the state illustrated in FIG. 9A, other parts are not changed as illustrated in FIG. 9B, in other words, maintained in the same state as that illustrated in FIG. 7B.

Figure 11A:
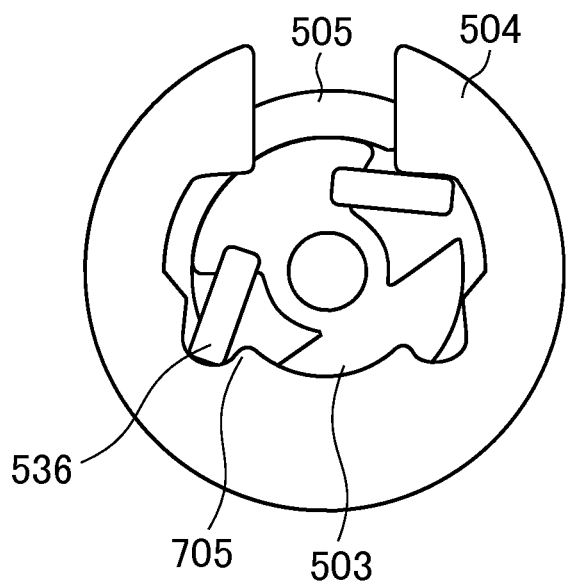
FIG. 11A is yet another explanatory view of the operation of the shift actuator.
Figure 11B:
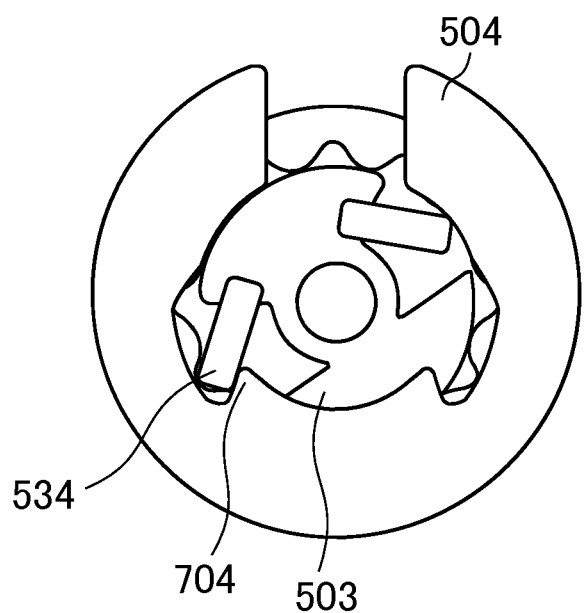
FIG. 11B is yet another explanatory view of the operation of the shift actuator.

Note that, as illustrated in FIGS. 11A and 11B, at a time point when the second rotary member 503 is rotated counterclockwise at approximately 30°, a lug plate 534 abuts against a locking surface 704 of the regulating member 504. With this configuration, a rotation angle of the second rotary member 503 is limited to approximately 30°, for example. Further, at a time point when the third rotary member 505 is rotated counterclockwise at approximately 45°, the lug plate 536 abuts against a locking surface 705. With this configuration, a rotation angle of the third rotary member 505 is limited to approximately 45°, for example.

In this manner, in the present preferred embodiment, the rotatable angle of the third rotary member 505 is set to be higher than the rotatable angle of the second rotary member 503. In this case, the rotary shaft of the motor 39c only needs to be rotated by an amount sufficient to rotate the third rotary member 505 at a rotation angle of, for example, approximately 30° or more, and hence control on the motor 39c with the control device 10 is facilitated. With this configuration, deficiency in a rotation amount of the third rotary member 505 is reliably prevented. As a result, the second rotary member 503 is reliably rotated, and hence the shift cam 39b is reliably rotated in conjunction therewith.

After that, the control device 10 controls the motor 39c again so as to rotate the rotary shaft of the motor 39c clockwise at a predetermined angle, specifically, to return the rotary shaft to its original position. With this configuration, the first transmission member 507 and the third rotary member 505 are rotated clockwise approximately 45°. As a result, the third rotary member 505 returns to its original position (the same position as that in the normal mode).

Note that, when the second rotary member 503 returns to the normal mode, in recessed portions 514 provided in an outer peripheral surface of the first rotary member 501, balls 603 are urged by the springs 602 to the first rotary member 501 side through intermediation of moving members 604. With this configuration, the rotation of the first rotary member 501 is restricted. At this time, torque that is generated by the balls 603 so as to restrict the rotation of the first rotary member 501 is set to be higher than a torque that regulates relative rotation between the second rotary member 503 and the first rotary member 501. With this configuration, only the second rotary member 503 is rotated under a state in which the first rotary member 501 and the shift cam 39b are stopped. In conjunction with each rotation of the motor 39c at a predetermined rotation angle as described above, the shift cam 39b is intermittently rotated at each predetermined rotation angle. Note that, as described above, the basic structure and operation of the shift actuator are well known as described, for example, in Japanese Patent Application Laid-open No. 2010-156408, and hence detailed description thereof is omitted. Note that, the force storing mechanism and the structure and the operation of the shift actuator 39 including the force storing mechanism are merely an example, and not limited to those in the above description.

Figure 12:
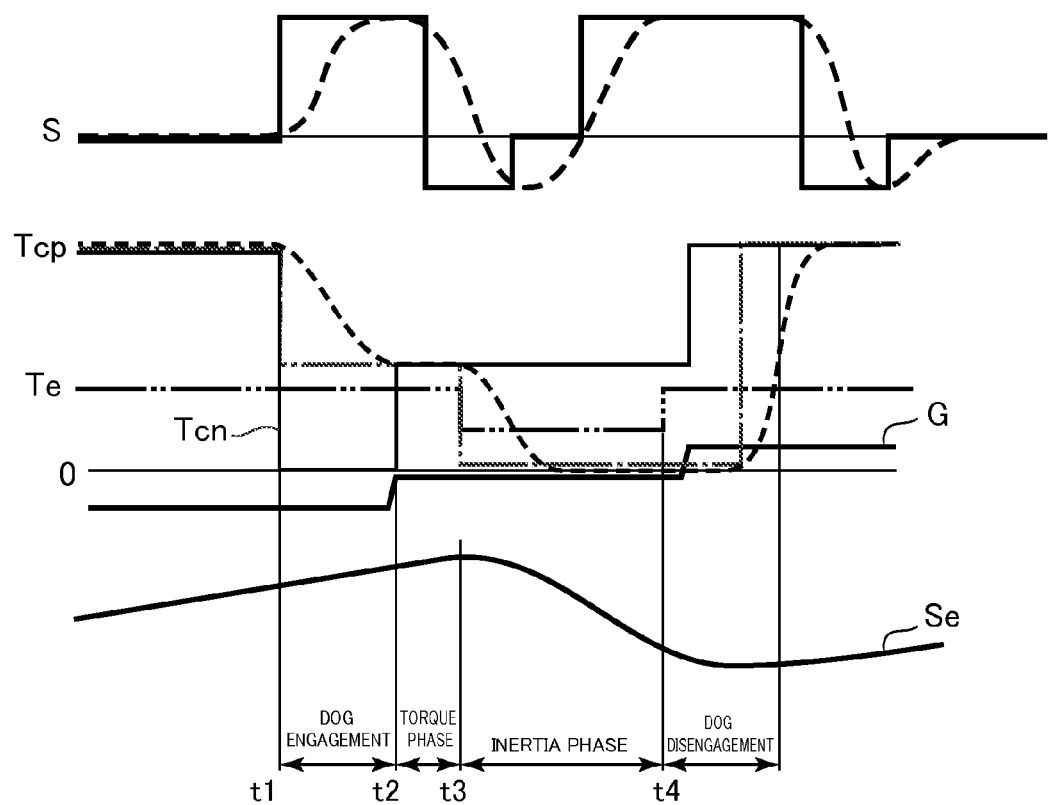
FIG. 12 is a timing chart of the gear shift control.

FIG. 12 is a timing chart of the gear shift control according to the present preferred embodiment. In FIG. 12, a solid line S indicates the target shift-actuator positions, and a broken line S indicates actual shift-actuator positions. Further, in FIG. 12, an upper side with respect to the neutral position corresponds to forward rotation of the motor, and a lower side corresponds to reverse rotation of the motor. Thus, a corresponding rotation angle becomes higher as the portion separates from the neutral position toward the upper side or the lower side. Further, a solid line Tcp indicates target torque on a release side, a solid line Tcp indicates target torque on an engagement side, and a broken line Tcp indicates an actual torque on the release side. In addition, a solid line G indicates gear positions in the gearbox 30, and a solid line Se indicates an engine rpm (corresponding to an engine rotational speed).

As shown in FIG. 12, during normal driving, the control device 10 outputs a target position signal so that the target shift-actuator position of the shift actuator 39 is shifted to the neutral position. With this configuration, an actual position of the shift actuator 39 is maintained at the neutral position. Further, the control device 10 outputs a target torque signal so that the two clutches Cp and Cn are engaged with each other, in other words, the maximum torque transmission capacities are obtained. With this configuration, actual torque capacities are maintained in a maximum state.

Next, in response to a gear shift command, the control device 10 starts the dog engagement phase (t1). In this dog engagement phase, the control device 10 changes the engaged mode of the next clutch Cn into the disengaged mode. Note that, the engaged mode refers to a mode in which the maximum torque transmission capacity is obtained, and the disengaged mode refers to a mode in which the minimum torque transmission capacity (for example, 0 Nm) is obtained. Further, the control device 10 changes the engaged mode of the previous clutch Cp into a half-engaged mode. In addition, the control device 10 outputs the target position signal so that the position of the shift actuator 39 is shifted to a gear shift position. In accordance therewith, the rotational force of the motor 39c is stored in the force storing mechanism as described above. Then, when the force stored as described above reaches a predetermined value, the stored force is released. With this configuration, the shift cam 39b is rotated to move corresponding movable gears so that a dog clutch on the engagement side is engaged. Specifically, as described above, the movable gear Gn1 of the next transmission mechanism Tn is moved toward the fixed gear Gn2.

Next, the control device 10 starts the torque phase (t2). In this torque phase, the control device 10 changes the disengaged mode of the next clutch Cn into the half-engaged mode. The previous clutch Cp is maintained in the half-engaged mode. Further, the movable gear Gn1 and the fixed gear Gn2 are maintained in the engaged mode.

Next, the control device 10 starts the inertia phase so as to reduce the engine rpm Se (t3). Specifically, the control device 10 changes the torque transmission capacity of the previous clutch Cp into the release mode. Then, the control device 10 lowers the engine torque Te relative to a torque transmission capacity Tcn of the next clutch Cn so as to reduce the engine rpm Se. Further, the movable gear Gn1 and the fixed gear Gn2 are maintained in the engaged mode.

Note that, before starting the dog disengagement phase, the control device 10 outputs target position signals so that the position of the shift actuator 39 that has been moved to the gear shift position is shifted sequentially to a reverse rotation position and the neutral position. Next, before the dog disengagement phase, in order to disengage the dog clutches on a disengagement side, the shift actuator 39 is shifted to the gear shift position so as to store the force in the force storing mechanism. Note that, the shift actuator 39 is shifted to the reverse rotation position so that the position of the shift actuator 39 is reliably returned to the neutral position.

Next, the control device 10 starts the dog disengagement phase (t4). In the dog disengagement phase, the control device 10 sets the target torque so that the previous clutch Cp enters the engaged mode. Further, the force storing mechanism releases the stored force so as to move the movable gear Gp1 of the transmission mechanism Tp toward the neutral position.

Specifically, in the dog disengagement phase, the dog portions of the movable gear GP1 and the fixed gear Gp2 on the disengagement side are disengaged from each other. However, the control device 10 continues to maintain the position of the shift actuator at the gear shift position. Thus, when the movable gear Gp1 is moved from the gear shift position, not only a force that is generated by the shift actuator 39 so as to maintain the position of the shift actuator at the gear shift position, but also an urging force to maintain the shift cam 39b at a predetermined rotation angle (for example, an urging force provided by an urging portion defined by the springs 601 and 602 described above) is applied to the movable gear Gp1 through intermediation of the shift cam 39b. With this configuration, the movable gear Gp1 and the fixed gear Gp2 are effectively prevented from being re-engaged with each other.

After that, the control device 10 returns each of the previous clutch Cp and the next clutch Cn into the engaged mode. In other words, the clutch Cp on a power transmitting side is engaged with the movable gear Gp1 and the fixed gear Gp2 on the disengagement side. Then, after a difference occurs between an rpm of the movable gear Gp1 and an rpm of the fixed gear Gp2, the shift actuator 39 is shifted to the reverse rotation position, and then returned to the neutral position. At this time point, the difference between the rpm of the movable gear Gp1 and the rpm of the fixed gear Gp2 has already occurred. Thus, even when the shift actuator 39 is returned to the neutral position (even with the urging force by the urging portion), the movable gear Gp1 and the fixed gear Gp2 are difficult to engage with each other.

Figure 13:
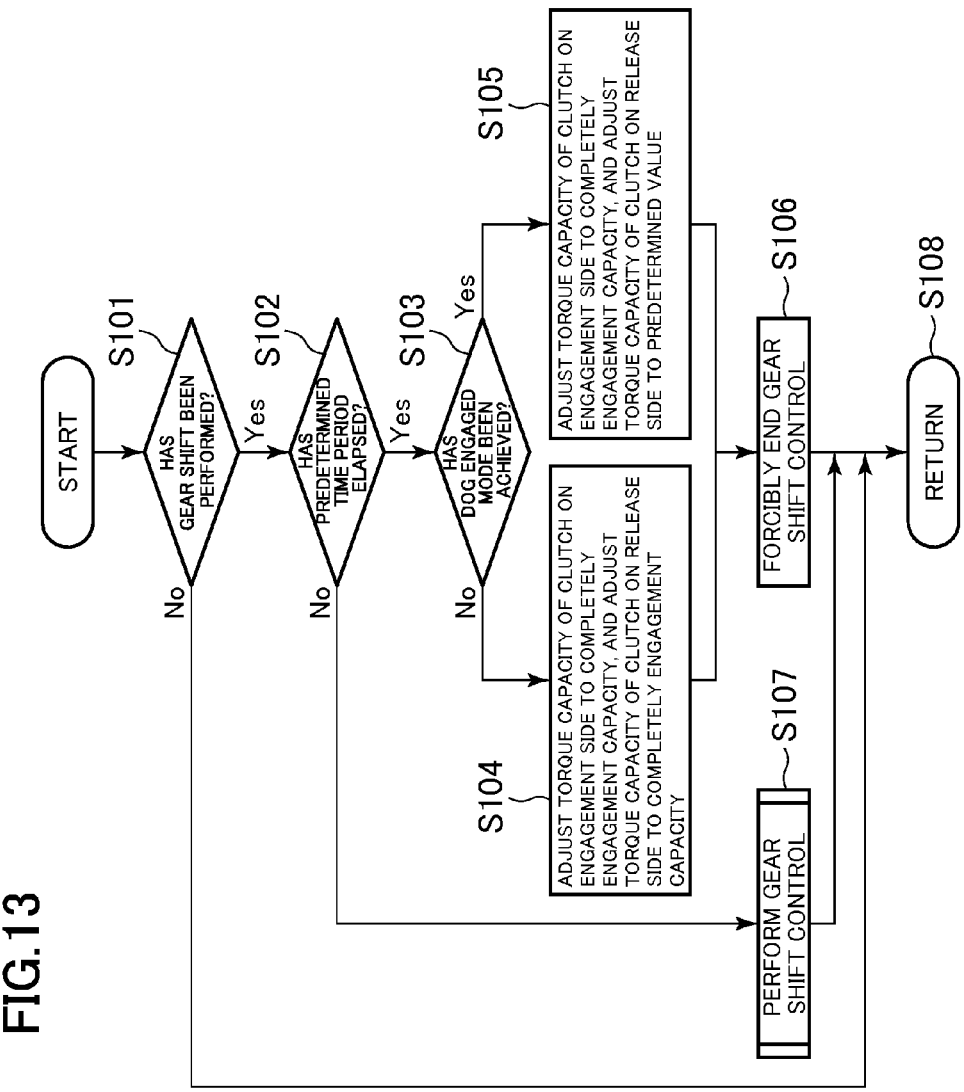
FIG. 13 is an explanatory flow chart of processes of the control device.

Next, with reference to FIGS. 13 to 16, description is made of a more specific operational flow of the control device 10 according to the present preferred embodiment and a vehicle including the control device 10. As shown in FIG. 13, the control device 10 determines whether or not a gear shift has been performed (S101). Specifically, in a case where any of processes of Steps S201 to S228 described below has been executed, the control device 10 determines that the gear shift has been performed. When the control device 10 determines that the gear shift has not yet been performed, the flow proceeds to RETURN of Step S108 so that the flow is restarted from START. On the other hand, when it is determined that the gear shift has been performed in Step S101, the control device 10 determines whether or not a predetermined time period has elapsed after the determination that the gear shift has been performed (S102). When it is determined that the predetermined time period has not yet elapsed, the control device 10 executes a gear shift control process described below (S107). When it is determined that the predetermined time period has elapsed in Step S102, the control device 10 determines whether or not the dogs on the disengagement side are engaged with each other (S103).

When it is determined that the dogs on the disengagement side have been normally disengaged from each other, in other words, the dogs on the disengagement side have not yet been engaged with each other, the control device 10 causes the clutch on the engagement side (corresponding to the clutch Cp described above) and the clutch on the release side (corresponding to the clutch Cn described above) to be completely engaged with each other (S104). Then, the flow proceeds to Step S106. When it is determined that the dogs on the disengagement side have been engaged with each other, the control device 10 determines that the dogs on the disengagement side have not been normally disengaged from each other by the gear shift control. Then, the control device 10 issues a command to completely engage the clutch on the engagement side, and issues a command to cause a torque capacity of the clutch on the release side to reach a predetermined value, for example, 0 Nm (S105). Then, the flow proceeds to Step S106. Next, the control device 10 forcibly ends the gear shift control process described below (S106). After that, the flow proceeds to RETURN of Step S108.

As described above, the gear shift control is forcibly ended irrespective of whether or not the dogs on the disengagement side have been normally disengaged from each other during a gear shift. With this configuration, a delay in the gear shift operation does not occur, and hence a sense of discomfort derived from the delay to the rider is substantially reduced or prevented during the gear shift control. Further, conditions of the dogs need not to be detected with high accuracy, and hence it is unnecessary to use sensors with high resolution, or to incorporate complicated control logic in the control device 10. As a result, the control device 10 and the vehicle including the control device 10 are simplified in configuration. Further, in this case, when a clutch capacity of the clutch on the release side is controlled and temporarily reduced, for example, to 0 Nm with simultaneous use of what is called a back torque limiter, an abnormal state (state in which engagement of the dogs is maintained) is maintained without causing the rider to feel abnormal shocks or reduction in the driving force. Note that, the sense of discomfort occurs in a case where a gear shift needs to be performed within a short time period, and hence the control described above may be performed only in a manual shift mode of performing a gear shift generally within a short gear-shift time period. Further, in this case, during the gear shift, a fuel cut rpm corresponding to over revolution may be temporarily increased. With this configuration, the engine torque is restored simultaneously with a start of the gear shift, and the clutch is appropriately controlled in accordance therewith. As a result, the gear shift shock is reduced, and an acceleration force is also be restored simultaneously with the start of the gear shift so as to manage the gear shift shock and the acceleration force.

Figure 14:
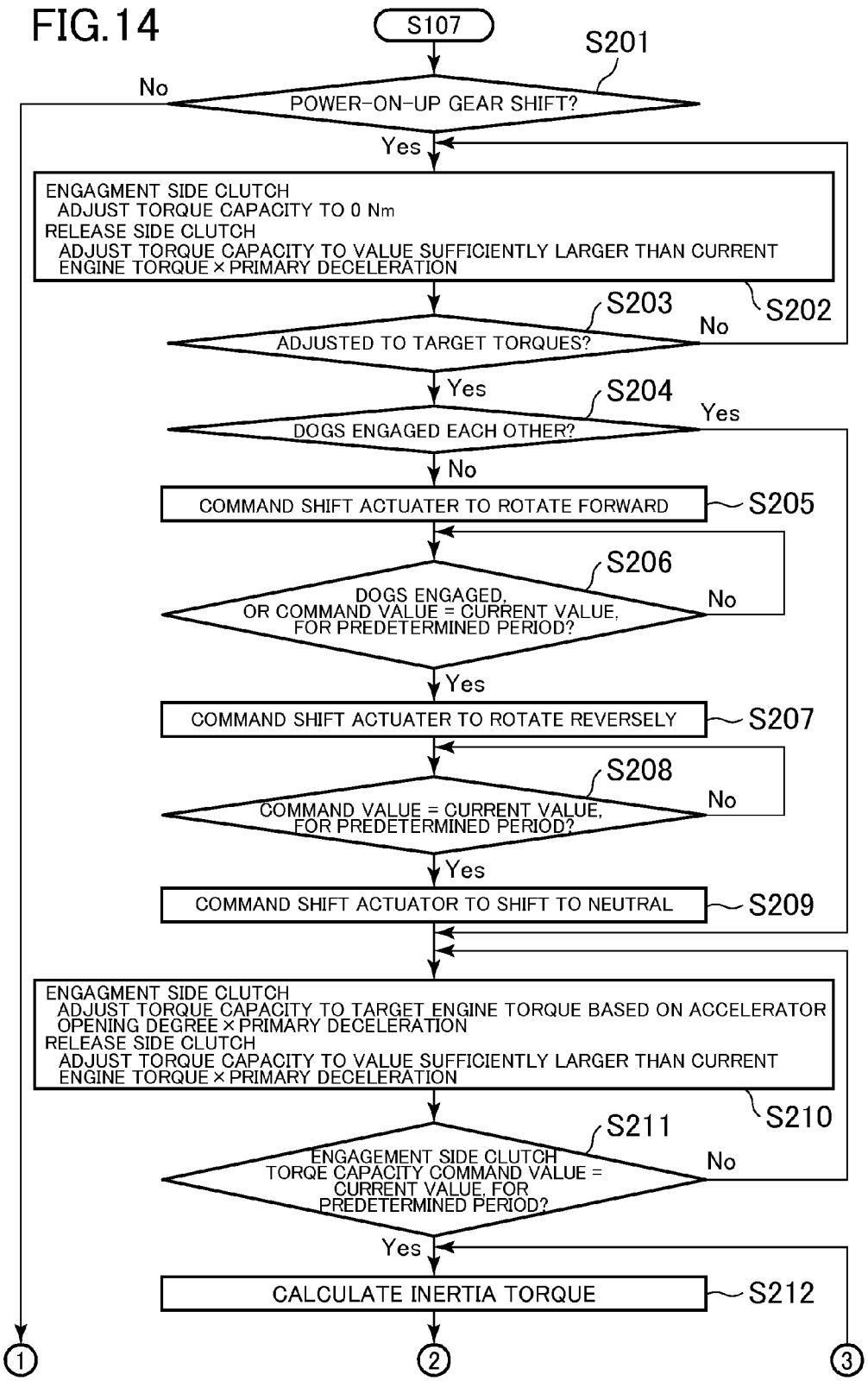
FIG. 14 is another explanatory flow chart of the processes of the control device.
Figure 15:
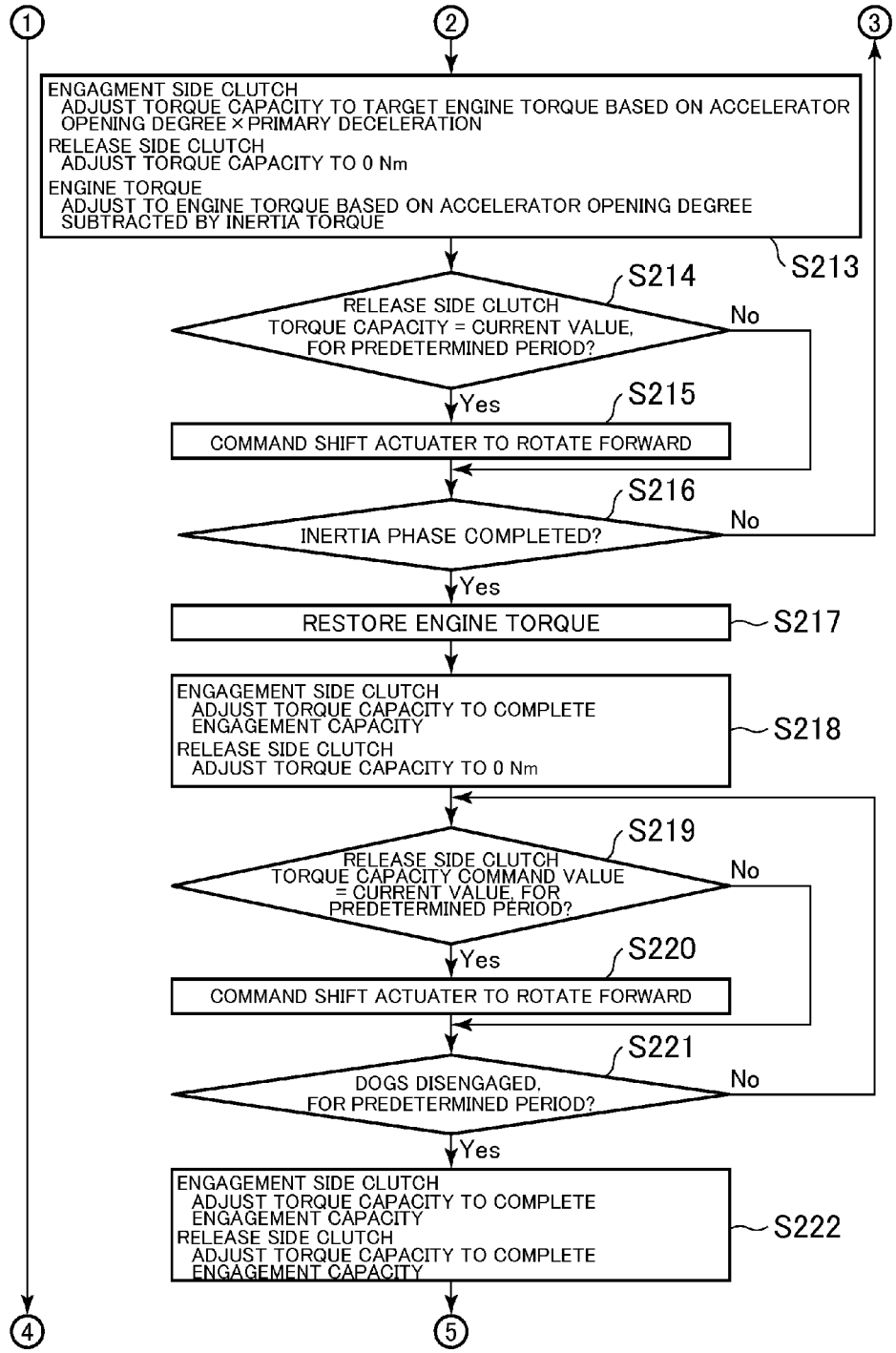
FIG. 15 is still another explanatory flow chart of the processes of the control device.
Figure 16:
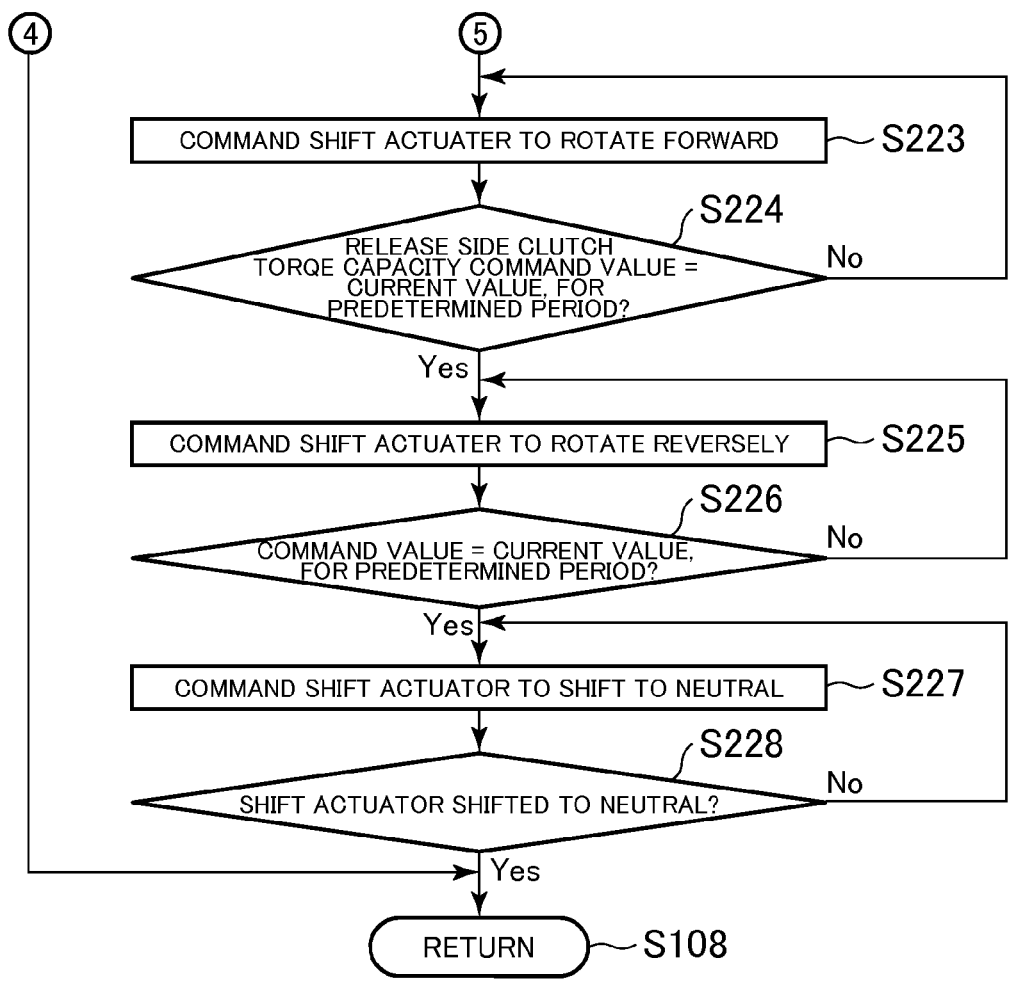
FIG. 16 is yet another explanatory flow chart of the processes of the control device.

Next, with reference to FIGS. 14 to 16, description is made of details of the gear shift control process of Step S107 shown in FIG. 13. First, as shown in FIG. 14, the control device 10 determines whether or not the control device 10 has performed the power-on shift-up control or the power-off shift-up control (S201). When the control device 10 determines that none of the power-on shift-up control and the power-off shift-up control has been performed, the flow proceeds to RETURN of Step S108.

When it is determined that the power-on shift-up control or the power-off shift-up control has been performed, the control device 10 issues torque commands of providing predetermined target torque capacities to the clutch on the engagement side and the clutch on the release side (S202). Specifically, the clutch on the engagement side is controlled into a sufficiently disengaged state (for example, torque capacity is adjusted to 0 Nm). A torque capacity of the clutch on the release side is adjusted to a value that is obtained by adding a predetermined value to a value that is obtained by multiplying a target engine torque that is determined based on an accelerator opening degree by a primary reduction gear ratio. Here, the predetermined value may include a predetermined constant (for example, about 20 Nm), a predetermined multiple of the engine torque (for example, primary reduction gear ratio of about×1.2 times), or a combination thereof. Note that, Step S202 corresponds to the timing t1 in FIG. 12.

The control device 10 determines whether the clutch on the engagement side and the clutch on the release side have been controlled to have the target torques (S203). Then, when the control device 10 determines that the clutch on the engagement side and the clutch on the release side have been controlled to have the target torques, the flow proceeds to Step S204. When the control device 10 determines that the clutch on the engagement side and the clutch on the release side have not yet been controlled to have the target torques, the flow returns to Step S202.

Note that, with regard to this determination, when the control device 10 includes a measurement unit that measures positions of the clutch actuators 49A and 49B, relationships between the positions and the torque capacities of the clutch actuators 49A and 49B may be measured in advance so that the determination is made based on whether or not deviations of the measured positions and positions at which the target torque capacities are obtained fall within a predetermined range. Alternatively, when the clutch actuators 49A and 49B include hydraulic clutch actuators 49A and 49B and the control device 10 includes a measurement unit that measures oil pressures thereof, relationships between the oil pressures and the torque capacities may be measured in advance so that the determination is made based on whether or not deviations of the measured oil pressures and the oil pressures with which the target torque capacities are obtained fall within a predetermined range. Still alternatively, when the control device 10 includes a measurement unit that measures strains of a case (a portion that counterbalances reactive forces of the actuators), which are generated by an operation of the clutch actuators 49A and 49B, relationships between the strains and the torque capacities may be measured in advance so that the determination is made based on whether or not deviations of the measured strains and the strains with which the target torque capacities are obtained fall within a predetermined range. Note that, the relationships between the measured positions and the like and the torque may be static or dynamic.

When it is determined that the clutch on the engagement side and the clutch on the release side have been controlled to have the target torques in Step S203, the control device 10 determines whether or not dogs on the engagement side (dogs arranged on a downstream side with respect to the next clutch Cn) have been engaged with each other (S204). Specifically, in a case where the control device 10 includes a detection unit that detects a shift position of the shift actuator 39, when the shift position is continuously detected within a range of a predetermined value for a predetermined time period, the dogs are determined to have been engaged with each other. Alternatively, in a case where the control device 10 includes a detection unit that detects the engine rpm and a main shaft rpm, when a state in which a difference obtained by subtracting the main shaft rpm on the engagement side from a quotient of the engine rpm and primary deceleration is maintained within a predetermined range is continuously detected for a predetermined time period, the dogs are determined to have been engaged with each other. Then, when the control device 10 determines that the dogs have not yet been engaged with each other, the flow proceeds to Step S205, and when the control device 10 determines that the dogs have been engaged with each other, the flow proceeds to Step S210.

When it is determined that the dogs have not yet been engaged with each other in Step S204, the control device 10 issues a command to rotate forward the shift actuator 39 to the shift actuator 39 (S205). Note that, the command of forward rotation corresponds to the target position signal to rotate the position of the shift actuator to the gear shift position. Next, the control device 10 determines whether or not the dogs have been engaged with each other, or whether a time period that has elapsed after a current value of the shift actuator 39 reaches a command value falls within a predetermined range (S206). Note that, as in Step S204, the determination as to whether or not the dogs have been engaged with each other may be made based, for example, on whether or not a state in which deviations of the current value of and the command value to the shift actuator 39 are maintained to be equal to or less than a predetermined value for a predetermined time period has been achieved. Next, a command of reversely rotating the shift actuator 39 is issued to the shift actuator 39 (S207). Note that, the command of reverse rotation corresponds to the target position signal to rotate the position of the shift actuator to the reverse rotation position. Next, the control device 10 determines whether the time period that has elapsed after the current value of the shift actuator 39 reaches the command value falls within the predetermined range (S208). Then, a command of shifting the shift actuator 39 to the neutral position is issued to the shift actuator 39 (S209).

The control device 10 issues torque commands of providing predetermined target torque capacities to the clutch on the engagement side and the clutch on the release side (S210). Specifically, the control device 10 issues a command of providing a torque capacity that is obtained by multiplying a target engine torque that is determined based on an accelerator opening degree by a primary reduction gear ratio to the clutch on the engagement side. As in Step S202, the control device 10 issues a command of providing a torque capacity that is obtained by adding a predetermined value to the value that is obtained by multiplying the target engine torque that is determined based on the accelerator opening degree by the primary reduction gear ratio to the clutch on the release side. Note that, Step S210 corresponds to the timing t2 in FIG. 12. Next, the control device 10 determines whether or not a state in which the command value of the torque capacity of the clutch on the engagement side is maintained to be equal to a current value of the clutch on the engagement side for a predetermined time period has been achieved (S211). When the control device 10 determines that this state has not yet been achieved, the flow returns to Step S210. When the control device 10 determines that this state has been achieved, the flow proceeds to Step S212.

Next, inertia torque that is generated at the time of a gear shift is calculated (S212). Specifically, the inertia torque is calculated, for example, by an expression of inertia torque=drive shaft rpm×(gear ratio before gear shift−gear ratio after gear shift)×primary gear reduction ratio/inertia phase generating time period×inertia around crank. Further, the inertia phase generating time period is represented, for example, by map values corresponding to the accelerator opening degree and the speed, and calculated based on the table below.

TABLE 1

| Speed | Accelerator opening degree | | | | |
|---|---|---|---|---|---|
| | 0 | 20 | 40 | 60 | 80 |
| 1→2 | 100 | 100 | 100 | 100 | 100 |
| 2→3 | 100 | 100 | 100 | 100 | 100 |
| 3→4 | 100 | 100 | 100 | 100 | 100 |
| 4→5 | 100 | 100 | 100 | 100 | 100 |
| 5→6 | 100 | 100 | 100 | 100 | 100 |

The control device 10 issues a command to provide predetermined torque capacities to the clutch on the engagement side, the clutch on the release side, and the engine (S213). Specifically, the control device 10 controls the clutch on the engagement side so as to have the torque capacity that is obtained by multiplying the target engine torque that is determined based on the accelerator opening degree by the primary reduction gear ratio. While the clutch on the release side is controlled into the sufficiently disengaged state (for example, torque capacity is adjusted to 0 Nm). The engine torque is adjusted to a torque obtained by subtracting the inertia torque from the engine torque that is determined based on the accelerator opening degree. Note that, Step S213 corresponds to the timing t3 in FIG. 12. Next, the control device 10 determines whether or not a state in which the command value of the torque capacity of the clutch on the release side and a current value of the clutch on the release side are maintained to be equal to each other for a predetermined time period has been achieved (S214). When the control device 10 determines that this state has been achieved, the flow proceeds to Step S215. When the control device 10 determines that this state has not yet been achieved, the flow proceeds to Step S216.

A command of rotating forward the shift actuator 39 is issued to the shift actuator 39 (S215). Then, the control device 10 determines whether or not the inertia phase has been completed (S216). Specifically, for example, when a state expressed by drive shaft rpm×gear ratio after gear shift×primary gear reduction ratio−engine rpm<corresponding value is achieved, the inertia phase may be determined to have been completed. Alternatively, when a state in which a ratio between rpms is expressed by (drive shaft rpm×gear ratio before gear shift×primary gear reduction ratio−engine rpm)/(drive shaft rpm×(gear ratio before gear shift−gear ratio after gear shift)×primary gear reduction ratio)>corresponding value is achieved, the inertia phase may be determined to have been completed. Still alternatively, when any one of the states represented by the above-mentioned two expressions is achieved, the inertia phase may be determined to have been completed. When the control device 10 determines that the inertia phase has been completed, the flow proceeds to Step S217. When the control device 10 determines that the inertia phase has not yet been completed, the flow returns to Step S212.

Next, when it is determined that the inertia phase has been completed in Step S216, the control device 10 restores a command value of an engine torque to an original value (in other words, engine torque that is determined based on the accelerator opening degree) (S217). Note that, Step S217 corresponds to the timing t4 in FIG. 12. Next, the control device 10 issues a command of providing predetermined torque capacities to the clutch on the engagement side and the clutch on the release side (S218). Specifically, the control device 10 issues a command of providing a completely engagement capacity to the clutch on the engagement side, and a command of providing a torque capacity of 0 Nm to the clutch on the engagement side.

The control device 10 determines whether or not the state in which the command value of the torque capacity of the clutch on the release side and the current value of the torque capacity of the clutch on the release side are maintained to be equal to each other for a predetermined time period has been achieved (S219). When the control device 10 determines that this state has not yet been achieved, the flow proceeds to Step S221. When the control device 10 determines that this state has been achieved, the flow proceeds to Step S220 so that the command of rotating forward the shift actuator 39 in Step S215 is continued (S220).

The control device 10 determines whether or not the dogs have been disengaged from each other for a predetermined time period (S221). Specifically, in a case of using the control device 10 including a detector to detect the shift position, when a state in which the shift position is maintained within a range of a predetermined value is continuously detected for a predetermined time period, the control device 10 determines that the dogs have been engaged with each other. As for a control unit including a detector to detect the engine rpm and the main shaft rpm, when the state in which the difference obtained by subtracting the main shaft rpm on the engagement side from the quotient of the engine rpm and primary deceleration is maintained within a predetermined range is continuously detected for a predetermined time period, the control device 10 determines that the dogs have been engaged with each other. When the control device 10 determines that the dogs have not yet been disengaged from each other, the flow returns to Step S219. When the control device 10 determines that the dogs have been disengaged from each other for a predetermined time period in Step S221, the control device 10 controls both the clutches so that complete engagement capacities are provided thereto (S222). Note that, in a case where the complete engagement capacity of the clutch on the release side, which is provided through the control in Step S218, has been maintained, this state is maintained.

The control device 10 continues the command of rotating forward the shift actuator 39 provided in Step S215 (S223). As in Step S214, the control device 10 determines whether or not the state in which the command value and the current value of the torque capacity of the clutch on the release side are maintained to be equal to each other for a predetermined time period has been achieved (S224). In a case where this state has not yet been achieved, the flow returns to Step S223 so that the forward rotating command is issued again. In a case where this state has been achieved, a command of reversely rotating the shift actuator 39 is issued to the shift actuator 39 (S225). As in Step S208, the control device 10 determines whether the time period that has elapsed after the current value of the shift actuator 39 reaches the command value falls within the predetermined range (S226). When the control device 10 determines that the predetermined time period has not yet elapsed, the flow returns to Step S225. When the control device 10 determines that the predetermined time period has elapsed, the flow proceeds to Step S227 so that the command of shifting the shift actuator 39 to the neutral position is issued to the shift actuator 39 (S227). Then, the control device 10 determines whether or not the shift actuator has been shifted to the neutral position for a predetermined time period (S228). When the control device 10 determines that the shift actuator has not yet been shifted to the neutral position, the flow returns to Step S227. When the control device 10 determines that the shift actuator has been shifted to the neutral position, the flow proceeds to RETURN of Step S108.

According to the present preferred embodiment, as described above, in the dog disengagement phase, the dog portions of the movable gear Gp1 and the fixed gear Gp2 on the disengagement side are disengaged from each other. However, the control device 10 continues to maintain the position of the shift actuator at the gear shift position. Thus, when the movable gear Gp1 is moved from the gear shift position, not only the force that is generated by the shift actuator 39 so as to maintain the position of the shift actuator at the gear shift position, but also the urging force to maintain the shift cam 39b at a predetermined rotation angle (for example, urging force provided by the urging portion defined by the springs 601 and 602 described above) is applied to the movable gear Gp1 through intermediation of the shift cam 39b. With this configuration, the movable gear Gp1 and the fixed gear Gp2 are effectively prevented from being re-engaged with each other.

The present invention is not limited to the preferred embodiments described above, and various modifications may be made thereto. For example, the configuration of the preferred embodiments described above may be replaced with a configuration that provides substantially the same configuration and substantially the same flow, a configuration that provides the same functions and advantages, or a configuration that can achieve the same advantages and benefits as those in the preferred embodiments described above. For example, in the flow in the case described above, before the start of the torque phase (S210), the processes from issuing the command of reverse rotation to issuing the command of shift to the neutral position preferably are executed by the shift actuator 39 (S207 to S209). However, as shown in the timing chart of FIG. 12, the processes from issuing the command of reverse rotation to issuing the command of shift to the neutral position (S207 to S209) may be executed before the start of the dog disengagement phase. Further, the processes of Steps S101 to S106 are executed in the case described above, but the processes of Steps S101 to S106 need not be executed, in other words, only the gear shift control (S107) may be performed. Still further, the power-on shift-up control and the power-off shift-up control preferably are performed in the case described above, but the present invention may be applied to a case where the power-on shift-down control or the power-off shift-down control is performed. Yet further, the shift mechanism 500 in the case of the preferred embodiments described above preferably includes the force storing mechanism, but the present invention may be applied to a shift mechanism without the force storing mechanism. Yet further, the motorcycle 1 is described as an example in the above description, but the present invention may be applied to vehicles of other types such as a four-wheeled buggy and a snowmobile.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A control device comprising:
a clutch control unit configured and programmed to output torque signals to control torques to be applied to clutches provided respectively on two paths that transmit torque from an engine; and
a shift actuator control unit configured and programmed to control a rotation position of a shift actuator so as to move movable gears in a transmission, the transmission including odd-speed movable gears, odd-speed fixed gears, even-speed movable gears, and even-speed fixed gears, and configured to connect to each of the clutches; wherein
the shift actuator control unit is configured and programmed to output a target position signal that corresponds to a target rotation position of the shift actuator so as to control engagement or disengagement of a dog portion of each of the movable gears and a dog portion of each of the fixed gears in the transmission; and
when shifting a gear speed to another gear speed, the shift actuator control unit outputs the target position signal so as to shift the rotation position of the shift actuator to a gear shift position at which a gear shift operation is performed by the transmission, the clutch control unit outputs the torque signals so as to connect one of the clutches that transmits power to, among the movable gears and the fixed gears, a movable gear or a fixed gear including a dog portion to be disengaged, and then the shift actuator control unit outputs the target position signal so as to return the rotation position of the shift actuator to a neutral position.

2. The control device according to claim 1, further comprising:
a shift cam that is rotated at a predetermined rotation angle in conjunction with each rotation of the shift actuator to the gear shift position; and
a shift fork including:
a first end connected to a corresponding one of outer circumferential grooves of the shift cam; and a second end connected to a corresponding one of the movable gears;

wherein the shift fork is configured to move the corresponding one of the movable gears so as to engage or disengage the dog portion of the corresponding one of the movable gears and the dog portion of a corresponding one of the fixed gears.

3. The control device according to claim 2, further comprising an urging device configured to apply an urging force to the shift cam so as to maintain the shift cam at the predetermined rotation angle.

4. The control device according to claim 2, wherein the transmission includes a force storing mechanism configured to store torque corresponding to the rotation position of the shift actuator, and the shift cam is rotated when the torque stored in the force storing mechanism reaches a predetermined value or more.

5. The control device according to claim 1, wherein, when the shift actuator control unit outputs the target position signal so as to return the rotation position of the shift actuator to the neutral position, the shift actuator control unit outputs the target position signal so as to rotate the shift actuator to a reverse rotation position that is located in a rotation direction reverse to a rotation direction to the gear shift position, and then outputs the target position signal so as to return the rotation position of the shift actuator to the neutral position.

6. The control device according to claim 1, wherein, after the shift actuator control unit outputs the target position signal so as to return the rotation position of the shift actuator to the neutral position, the control device makes a determination as to whether or not the movable gear or the fixed gear including the dog portion to be disengaged has been engaged, and the clutch control unit outputs, based on a result of the determination, the torque signals to control the torques to be applied to the clutches.

7. The control device according to claim 6, wherein, when the movable gear or the fixed gear including the dog portion to be disengaged is determined to have been engaged, the clutch control unit disengages a corresponding one of the clutches that has transmitted the power to the movable gear or the fixed gear including the dog portion to be disengaged.

8. The control device according to claim 6, wherein the control device ends the gear shift to the another gear speed after the clutch control unit outputs, based on the result of the determination, the torque signals to control the torques to be applied to the clutches.

9. A vehicle comprising the control device according to claim 1.

10. A non-transitory computer readable medium including a control program to control a computer to function as:

a clutch control unit configured to output torque signals to control torques to be applied to clutches provided respectively on two paths that transmit torque from an engine; and a shift actuator control unit configured to control a rotation position of a shift actuator so as to move movable gears in a transmission, the transmission including odd-speed movable gears, odd-speed fixed gears, even-speed movable gears, and even-speed fixed gears, and configured to connect to each of the clutches; wherein the shift actuator control unit outputs a target position signal that corresponds to a target rotation position of the shift actuator so as to control engagement or disengagement of a dog portion of each of the movable gears and a dog portion of each of the fixed gears in the transmission; and when shifting a gear speed to another gear speed, the shift actuator control unit outputs the target position signal so as to shift the rotation position of the shift actuator to a gear shift position at which a gear shift operation is performed by the transmission, the clutch control unit outputs the torque signals so as to connect one of the clutches that transmits power to, among the movable gears and the fixed gears, a movable gear or a fixed gear including a dog portion to be disengaged, and then the shift actuator control unit outputs the target position signal so as to return the rotation position of the shift actuator to a neutral position.

11. The control device according to claim 3, wherein the transmission includes a force storing mechanism configured to store torque corresponding to the rotation position of the shift actuator, and the shift cam is rotated when the torque stored in the force storing mechanism reaches a predetermined value or more.

12. The control device according to claim 7, wherein the control device ends the gear shift to the another gear speed after the clutch control unit outputs, based on the result of the determination, the torque signals to control the torques to be applied to the clutches.

* * * * *